United States Patent [19]

Masumoto

[11] Patent Number: 5,845,048
[45] Date of Patent: Dec. 1, 1998

[54] APPLICABLE RECOGNITION SYSTEM FOR ESTIMATING OBJECT CONDITIONS

[75] Inventor: Daiki Masumoto, Kanagawa, Japan

[73] Assignee: Fujitsu Limited, Kawasaki, Japan

[21] Appl. No.: 597,138

[22] Filed: Feb. 6, 1996

[30] Foreign Application Priority Data

Feb. 6, 1995 [JP] Japan ..................................... 7-018218

[51] Int. Cl.$^6$ .............................. G06E 1/00; G06F 15/18
[52] U.S. Cl. .................................. 395/22; 395/23; 395/24
[58] Field of Search ..................................... 382/291, 133, 382/48, 49, 14, 15, 41; 395/22, 21, 600, 20, 25, 27

[56] References Cited

U.S. PATENT DOCUMENTS

| | | | |
|---|---|---|---|
| 4,731,860 | 3/1988 | Wahl | 382/41 |
| 5,111,516 | 5/1992 | Nakano et al. | 382/14 |
| 5,465,353 | 11/1995 | Hull et al. | 395/600 |
| 5,499,306 | 3/1996 | Sasaki et al. | 382/291 |

*Primary Examiner*—Tariq R. Hafiz
*Attorney, Agent, or Firm*—Armstrong, Westerman, Hattori, McLeland & Naughton

[57] ABSTRACT

A system for recognizing an object state (the kind, position, attitude) gets observation object information and recognizes a naturally occurring object for which simple rules cannot be found. This system outputs a state prediction value for a targeted object from cognitive object observation data, an observation data prediction value for targeted partial features according to this output, a partial feature prediction position in targeted observation results according to a state evaluation value output, and recognizes the object by modifying an output of the state prediction value output unit. Many naturally occurring objects, for which simple rules cannot be found, can be modeled, and a recognition system, which can be used in more realistic circumstances, can be constructed. An object based vision and an observer based vision as a 3D object model representation method is provided, and learning patterns necessary for recognizing are obtained effectively by using a visible-invisible determination module in automatically obtaining the 3D object model.

23 Claims, 19 Drawing Sheets

| CATEGORY | POSE | EDGE |
|---|---|---|
| A | P | $(x_0, y_0, d_0), (x_1, y_1, d_1) \ldots$ |
| A | P' | . . |
| . | . | . |
| . | . | . |
| B | P | $(x_n, y_n, d_n), (x_{n+1}, y_{n+1}, d_{n+1}) \ldots$ |
| B | P' | . . |

FIG. 3

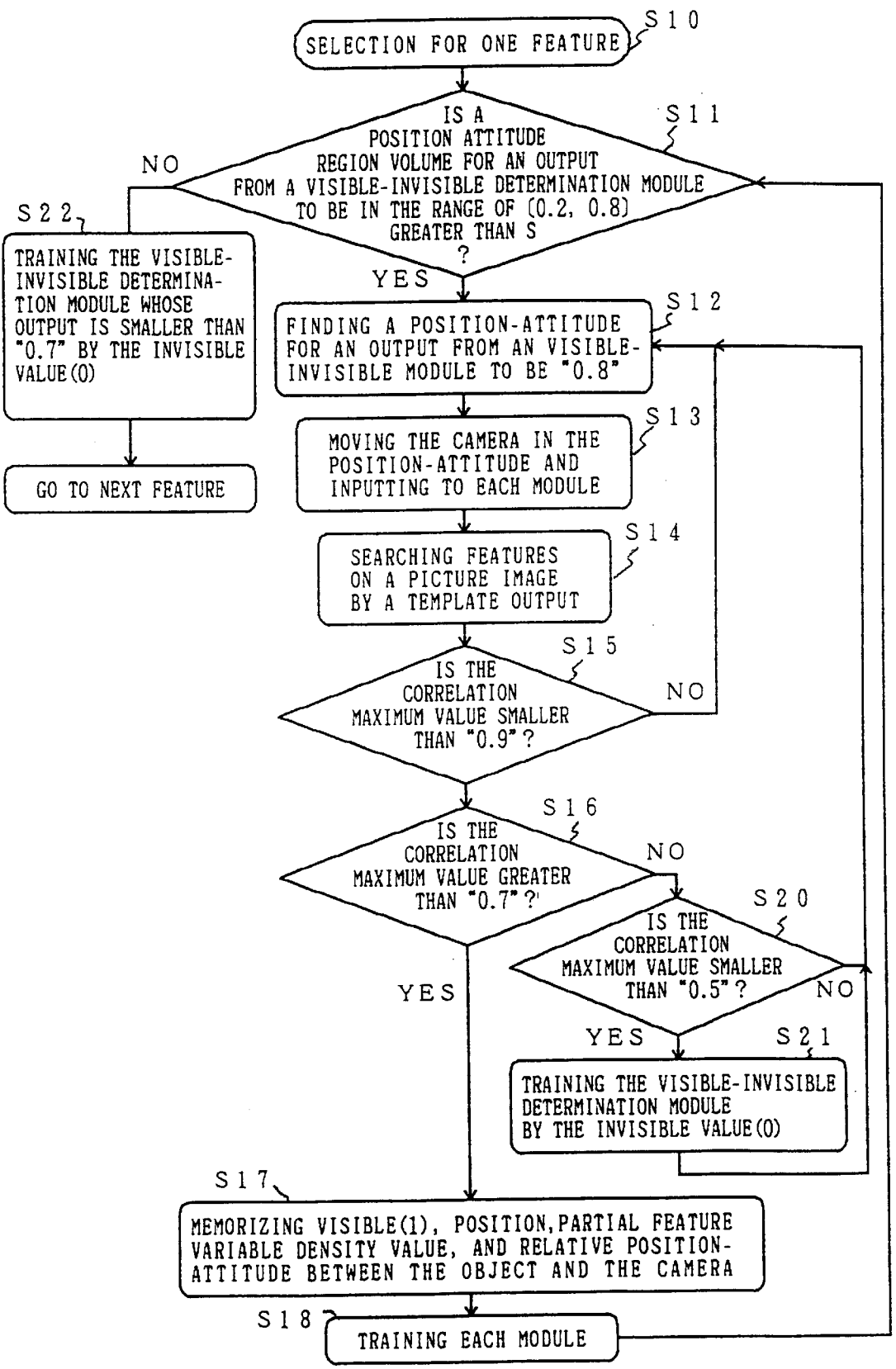
F I G. 7

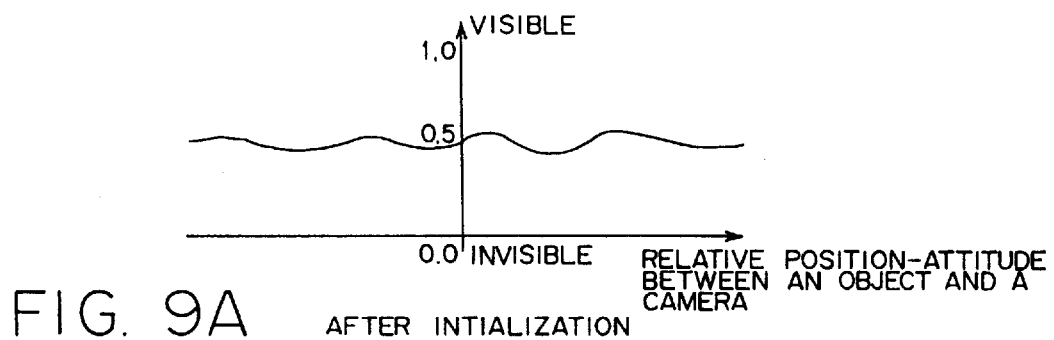
FIG. 9A  AFTER INTIALIZATION
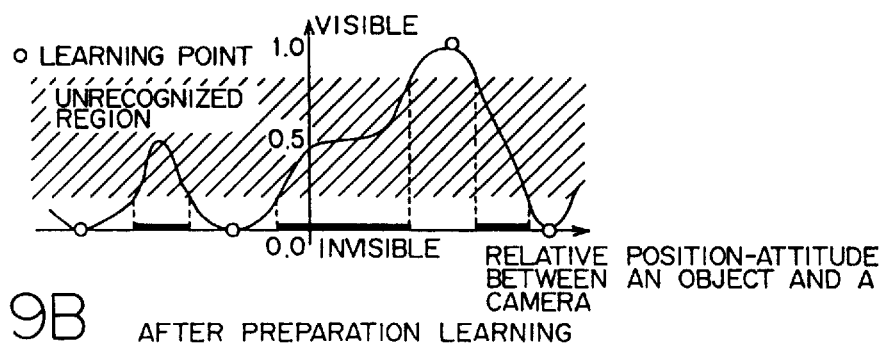
FIG. 9B  AFTER PREPARATION LEARNING
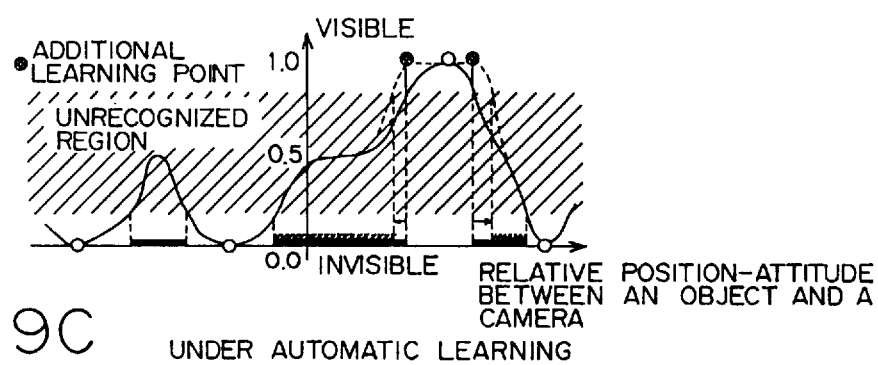
FIG. 9C  UNDER AUTOMATIC LEARNING
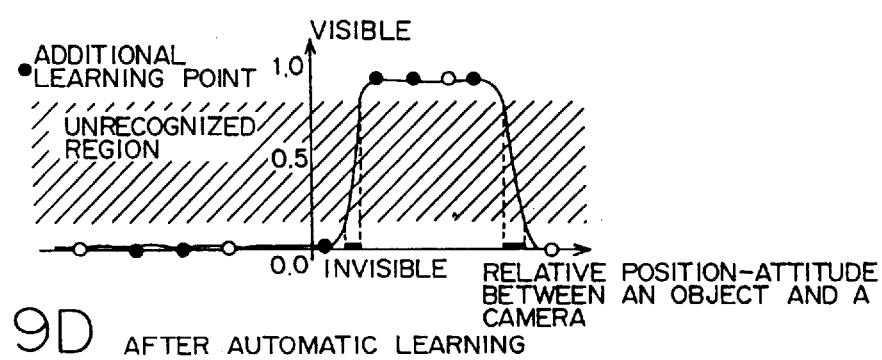
FIG. 9D  AFTER AUTOMATIC LEARNING

APPLICABLE RECOGNITION SYSTEM FOR ESTIMATING OBJECT CONDITIONS

BACKGROUND OF THE INVENTION

1. Field of the Invention

The present invention relates to recognition systems for estimating object conditions (type, position, attitude) by obtaining targeted object observation information. A robot having external sensors can recognize external circumstances, and operate on objects accordingly, by using these types of systems. Further, the systems can obtain relationships between object conditions and partial features obtained when observing the object. Furthermore, they can be applied to the fields of character recognition, document and mapping processing, remote sensing, and medical picture image processing and recognition. A robot is utilized in various fields of production processing. The industrial robot repeats predetermined procedures based on the predetermined process steps, according to signals from internal sensors. This kind of robot works well in well-maintained operation fields, but does not work very well in general situations, where circumstances change dynamically. Accordingly, a great deal of research is being made to instal various kinds of external sensors to a robot, which respond to circumstance changes, thereby realizing full working functionality corresponding to the external circumstances.

2. Description of the Related Art

The present invention is applied to recognition of an object by modeling the object using partial features and relationships. This model can be identified as one of the model-based vision researches being made in the fields of computing. Now, we will introduce an outline of the research in the model-based vision field. General literature relating to the model based vision is shown below.

R. T. Chin, and C. R. Dyer, "Model-Based Recognition in Robot Vision," ACM Computing Surveys, Vol. 18, No. 1, March, pp. 67–108 (1986).

In the field of model-based vision, picture image recognition is performed by using knowledge relating to the object configuration and aspect. By matching a part of the model with the features extracted from the picture image, "What exists (what)," and "Where it is placed (Where)" can be estimated specifically even if they cannot be determined uniquely. The model-based vision becomes an important element technology in the vision application field because this technology can interface between sensor data and knowledge.

In the model-based vision, the object is recognized in a way in which parameters (position and attitude parameters) of the object are determined for the features of the picture image and the model to achieve a match. Determining the object position and attitude parameters will be required when the robot interacts with the object. Further, it can be improved to the level of treating a deformed object and identifying a sub-category of the object, by introducing parameters corresponding to the model deformation.

The necessary element technology for composing the model-based vision systems has been developed in the process of various kinds of research. The following literature shows the topics relating to the element technology.

P. Suetens, P. Fua, and A. J. Hanson, "Computational Strategies for Object Recognition," ACM Computing Surveys, Vol. 24, No. 1, March, pp. 5–61 (1992).

The element technology can be divided into three categories in the model-based vision : Modeling; Characteristics (feature) extraction and matching; and Parameter estimation.

1. Modeling

Methods of representing the object model (model representation, generalized cylindrical expression, wire frame representation, etc) are presently being studied.

A model acquisition problem of generating the model (the use of CAD computer aided design data, the use of a range finder etc., model acquisition from plural 2D (two-dimensional) picture images, etc) has recently arisen.

2. Feature Extraction and Matching

The feature extraction problem of extracting the features for coordination with the object model (edge extraction, Hough transformation, etc.) has recently arisen.

The pattern matching problem of determining the feature relation between the object model and sensor data (pattern matching, correlation, elastic matching, etc) has recently arisen. At this point, elastic matching is the method of limiting the elastic energy to be within some range, for example, by connecting a mouth, nose, and eyes which can be approximated under one model respectively, when recognizing a human face.

3. Parameter Estimation

A problem of estimating object parameters, relative positions, and attitudes between the objects and sensors under the premise that the coordinating relation between the objects is determined (iterative algorithms like Newton's method etc., analytical solutions, etc) has recently arisen.

The prior art for modeling is explained because the present invention mostly relates to modeling among the element technologies described above.

A number of approaches have been attempted in order to try to represent a 3-dimensional (3D) object in a form suitable for the recognition. However, a systematic method for constructing a general-use model, namely a variety of object model representations, has not yet been found. A method for constructing the object model representation is generally divided into four categories: object-based representation and observer-based representation; object-based representation; observer-based representation; and CAD-based vision.

1. Object-based Representation and Observer-based Representation

A model consisting of the partial geometric attributes of an object and their geometric relations is developed. These attributes and relations should be exactly defined on the coordinate system. In the vision study, the coordinate system is used as either the object-based system or the observer-based system.

2. Object-based Representation

In the object recognition study, an object-based model is mainly used. One of the reasons for this is because the object model can be represented compactly since the object-based representation can represent the object independently from the observing point position. Marr and Nishihara have proposed a representation method based on the generalized cylindrical representation hierarchy. Similarly, ACRONYM by Brooks represents an airplane hierarchically by using the generalized cylindrical representation. Grimson and Lazono-Perez have represented the object as a flat surface collection model, where the expression for each flat surface is represented by an object-based coordinate system. According to these types of systems, it has been shown that a simple object can be recognized easily. However, it is difficult for the modeling method to be applied in order to represent more complicated objects. Further, the object-based representation model is independent from an observation process, so it is also difficult to sufficiently represent partially-hidden objects. The references relating to the above theory are shown below:

D. Marr and H. K. Nishihara, "Representation and recognition of the spatial organization of three-dimensional shape," in Proc. Roy. Soc. Lond. B, vol. 200, pp.recognition process 269–294 (1978).

R. A. Brooks, "Symbolic Reasoning Among 3D models and 2D Images," In Artificial Intelligence, Vol. 17, No. 1, pp. 285–348, August (1983).

W. E. L. Grimson and T. Lozano-Peretz, "Model-based recognition and localization from sparse range or tactile data," Int. J. Robotics Res., Vol. 3, No. 3, pp. 3–35 (1984).

W. E. L. Grimson and T. Lozano-Perez, "Localizing Overlapping Parts by Searching the Interpretation Tree," IEEE Transactions on Pattern Analysis and Machine Intelligence, Vol. 9, No. 4, pp. 469–482 (1987).

The picture image is the observer-based representation. Therefore, the coordinate conversion between the observer-based coordinate and the object-based coordinate should be decided. This type of conversion has six parameters, so an analytical solution cannot usually be made. Therefore, the object-based model is the best method when the object position and attitude from the observer are measured approximately or are measurable by a comparatively simple method. However, these methods cannot effectively represent a complicated object in a general external environment. Baird has analyzed the limited use based on the feature position, and has showed the effectiveness and the limitations of the method for effectively pruning an initial tree (possible corresponding space between the picture image features and the object features).

In the study using an object-based model in order to recognize a 3D object from a gray scale image, hypotheses which may not always be practical should be made. For example, Brooks has assumed that airplanes landed on the ground when recognizing an aerial photograph taken from an airplane, as his hypothesis. Ayache and Faugeras have assumed that a cognitive object should be a plane and the precise quantitative information relating to geometric properties of the object could be used. Chien and Aggarwal have assumed that a silhouette of an object can be made by a parallel projection. The references relating to the above topics are shown below:

H. S. Baird. Model-Based Image Matching Using Location Cambridge, Mass.: MIT Press (1984).

N. Ayache and O. D. Faugeras, "Hyper: A new approach for the recognition and positioning of two-dimensional objects," IEEE Transactions on Pattern Analysis and Machine Intelligence, Vol. 8, No. 1, pp.44–54 (1984).

C. H. Chien and J. K. Aggarwal. "Model construction and shape recognition from occluding contours," IEEE Transactions on Pattern Analysis and Machine Intelligence, Vol. 11, No. 4, pp. 372–389 (1989).

3. Observer-based Representation

In the observer-based model, non-linear conversion from the observer-based coordinate system to the object-based coordinate system is not necessary when representing the object with a possible 2D projected image. Approaches for quantizing a possible view into a finite set of aspects are well known. The number of viewing variations of the objects is represented by a finite number by corresponding each aspect to a projection in which a 3D object topology is different. A different aspect is represented independently as being another object. Therefore, unknown corresponding relations between the 2D picture image and the 3D model can be resolved by searching all aspects. Koenderink and van Doorn first proposed the basic idea of an aspect graph. In an aspect graph, a set of possible observing points is divided into the surface regions of a Gaussian sphere. The structure represented qualitatively of the object (or feature properties of the object) is assumed to be unchangeable. The assumptions relating to the object (what the object is, where it is viewed) are tested independently in each region of the observation sphere. As a research example using these methods, there have been studies by Goad, Dickinson, et al. The references relating to the above topics are listed below:

J. J. Koenderink and A. J. van Doorn, "The internal representation of solid shape with respect to vision," Biol. Cybern. vol. 32, pp. 211–216 (1979).

C. Goad, "Special purpose automatic programming for 3D model-based vision," in Proc. Image Understanding Workshop Virginia, pp. 94–104 (1983).

S. J. Dickinson, A. P. Pentland, and A. Rosenfeld, "Qualitative 3-D shape reconstruction using distributed aspect graph matching," in Proc. ICCV90 Osaka, pp. 257–262 (1990).

Methods for automatically obtaining the model have not been well developed until now. The models used in the acknowledgements are constructed artificially. For example, Chien and Kak have constructed a model by constructing a triangle on a surface with measuring points on a surface. In the aforementioned description of ACRONYM, Brooks has described the object hierarchically based on a generalized artificially constructed cylinder As another method, a method for constructing a model by extracting features from images projected from a plurality of observing points is known. For example, Fan et al. has used a plurality of model views. An operator selects plurality of views according to the complexity of the object, in order for the main surfaces of the object to be included in at least some of the views. Similarly, Jain and Hoffman have constructed a model for identifying the objects of a database containing ten objects by using fifteen sample picture images, respectively. Abu-Mostafa and Palatis, who had experience of using a neural network, have photographed the targeted object and have used the picture image as an object model. In this model, firstly, various kinds of object images are stored in an associative memory type neural network. A new image is given to the network and recognition is made by performing an association. The performance of this system is limited, based on how to define the standard of similarities (similarity degree) because of the associated memory. However, it is generally impossible for a simple similarity degree to be defined between images in which the same object is photographed from different observing points. As a result, the recognition may be impossible when the targeted object is photographed from observing points different from the model acquisition observing points. The references showing the above topics are as follows:

C. H. Chien and A. C. Kak, "A robot vision system for recognition 3-D objects in low-order polynomial time," IEEE Trans. Syst., Man, Cybern., Vol. 19, No. 6, pp. 1535–1563 (1989).

T. J. Fan, G. Medioni, and R. Nevatia, "Recognizing 3-D objects using Surface Descriptions," In Proceedings of IEEE 2nd International Conference on Computer vision, pp. 474–481 (1988).

A. K. Jain and R. Hoffman, "Evidence-based recognition of 3-D objects," IEEE Transaction on Pattern Analysis and Machine Intelligence, Vol. 10, No. 6, pp. 783–801 (1988).

Y. S. Abu-Mostafa and D. Pslatis, "Optical neural computing," Scientific America, 256, pp. 66–73 (1987).

4. CAD-based Vision.

Use of a CAD model (constructed mainly for purposes other than vision) as an object recognition model is currently evoking a great deal of interest. The CAD model represented by object-based coordinates provides a natural method for defining an object, and can be the information resource necessary for recognition. However, CAD models are generally constructed using unsuitable vision methods. Bhanu has presented a general discussion about CAD-based vision. Bolles and Horaud's 3D POS system also uses a CAD model for recognizing the 3D parts of the objects from range data and identifying their positions. Their model consists of two parts: an extended CAD model; and a feature category network model. The CAD model describes edges, surfaces, vertices, and their relations. In the feature category network model, a measurable feature is described by its type and size. A connection between a picture image feature and a model feature thereby becomes possible. Flynn and Jain have proposed a model scheme using a 3D object description generated by a commercial CAD system. The geometrical inference is processed in order to acquire a relational graph representation of the object. The relational graph representation includes both view independence information derived from the CAD description, and view dependence information extracted from the object view. Then, the graph is stored in the database for object recognition. The main idea of this study is to try to combine the object-based surface description with the observer-based information, in order to construct the object model as a relational graph. As for the recent studies of CAD-based vision, there are studies by Ikeuchi, Kuno, Hansen, and Henderson, etc. The references relating to the above topics are as follows:

B. Bhanu, "CAD-based robot vision," IEEE Comput., Vol. 20, No. 8, pp. 13–16 (1987).

B. Bhanu and C. Ho, "CAD-based 3D object representation for robot vision," IEEE Comput., Vol. 20, No. 8, pp. 19–35 (1987).

R. C. Bolles and P. Horaud, "3DPO: A three dimensional part orientation system," Int. J. Robotics Res., Vol. 5, No. 3 (1986).

P. J. Flynn and A. K. Jain, "CAD-based computer vision: From CAD models to relational graphs," IEEE Transactions on Pattern Analysis and Machine Intelligence, Vol. 13, No. 2, PP. 114–132 (1991).

K. Ikeuchi, "Generating an interpretation tree from a CAD model for 3D objects," Int. J. Computer Vision, Vol. 1, No. 2 (1987).

Y. Kuno, Y. Okamoto, and S. Okada, "Object recognition using a feature search strategy generated from a 3D model," in Proc. ICCV 90 Osaka, pp. 626–635 (1990).

C. Hansen and T. Henderson, "CADGD-based computer vision," IEEE Transaction on Pattern Analysis and Machine Intelligence, Vol. 11, No. 11, pp. 1181–1193 (1989).

In the aforementioned related arts, the method using the model vision is mainly based on a simple polyhedron, but has a problem in not being flexible enough to actually represent many objects as recognizable objects, although use of a polyhedron is convenient for the subject of study. Also, there are several other model representation methods, such as using a super quadratic equation representing a an ellipsoid or a spherical surface, using a generalized cylindrical representation, and using a volume primitive for treating the object as a particle conglomeration. These methods are described in the following reference.

P. J. Besl. "Geometric Modeling and Computer Vision," Proc. IEEE, Vol. 76, No. 8, pp. 936–958 (1988).

These methods have a significant advantage in that the object configuration can be represented by a small number of parameters, but also have a problem of not being suitable for modeling many naturally occurring objects in which a simple regularity cannot be seen.

For model acquisition in the conventional model-based vision system, cognitive objects were industrial parts capable of utilizing CAD data as the model, and a polyhedron which can be modeled easily. However, objects except the polyhedron and general objects not having CAD data should also be recognized in order for robots to be used in real, natural circumstances, so there is a further problem in which the method of acquiring the general object model is not included in the conventional method.

SUMMARY OF THE INVENTION

An object of the present invention is to present an object recognition system capable of inferring object conditions such as type, position, attitude, etc., using cognitive object measurement data output from sensors, aimed at identifying the objects existing in the general outside environment.

According to the present invention, many naturally occurring objects in which simple regularity cannot be found can be modeled, and a recognition system usable in a more realistic environment can be constructed. Further, this system can recognize whether the observed object is the same as the object model or not, and the relative position and attitude (for example, to six degrees of freedom) can be inferred when the objects are the same.

Further, the present invention includes the object-based representation model (partial feature position), the observer-based representation model (partial feature viewing way) as a 3D object model representation, and a learning pattern necessary for recognition can be automatically and effectively acquired by using a visible and invisible determination module for automatically acquiring the 3D object model.

The model representation of the partial template connection model is modeled by the partial geometric features of the object and the geometric relations between them, each partial template becomes the partial model of the object (observer-based representation), and the geometric relations between the partial features become the object model (object-based representation). The partial template connection model includes the observer-based representation model and the object-based representation model, the observer-based representation model is modeled using hierarchical neural networks when it is not easy to formulate how the object changes based on the view variations as seen in the partial features of the object. The neural network approximates the function of projecting the model feature on the picture image feature. On the other hand, the object-based representation is modeled when it is easy to formulate what the position relation is for the viewing variation as seen in the geometric relation between partial features. Thus, a variety of objects can be modeled easily by representing the objects in this way. Further, recognition is effectively made by using and combining with a visible and invisible module, for determining whether the partial features can be seen or not from certain observing points. The model acquisition is easy in general because the observerbased representation model can use the object as the direct model by changing the observing points at random. However, problems corresponding to recognizing each feature among the different views should be resolved in the case of the partial template connection model. The learning algorithm for acquiring images viewed from various points, in keeping with the corresponding relation for each feature, is constructed by using a visible-invisible determination module. The image necessary for recognition is effectively acquired by this algorithm.

A state prediction output unit is a prediction model which outputs targeted object state prediction values from measured data of a recognition target, such as sensor data. A partial feature observation result prediction unit outputs the partial features of the recognition target such as, for example, measurement data prediction, and picture element data prediction for edges, according to the state prediction value input to the partial feature observation result prediction unit from the output of the state prediction output unit, and includes a plurality of template modules controlled by a template module control unit. The partial feature prediction position output unit can be a position module, and outputs the prediction position of more than one partial feature prediction positions on the picture image, as an example of cognitive object observation results according to the state prediction value input to the partial feature observation result prediction unit from the state prediction output unit.

In the preferred embodiment of the present invention, the visible-invisible determination module is further included in order to accelerate the learning of the template module organized by hierarchical neural networks, for example, and to determine whether or not object features can be seen on the picture image, for realizing automatic learning as far as possible. A relative position-attitude prediction value between a camera, as an example of a sensor, and the cognitive object, is output from the prediction module, as an example of the state prediction output unit.

Furthermore, the object is recognized by successively modifying a prediction module output, such as the state prediction output unit, for example, in order to decrease the difference between the prediction positions on the picture image for partial features which the position module, as an example of the partial feature prediction position output unit, outputs, and the position on the picture image for each partial feature determined based on each template module output corresponding to each partial feature, as an example of a partial feature observation result prediction unit. Namely, in the learning of an applicable system for the present invention, a partial feature viewing way map, to show how the partial feature can be seen from the relative position-attitude between the sensor and the object, is learned by the visible-invisible module, as an example of the visible-invisible determination unit described above, and a template module such as the partial feature observation result prediction unit.

Further, a map to show the position of the observation data of the partial feature from the relative position-attitude between the sensor and the object is learned by the position module, as an example of the partial feature prediction position output unit. Thereby the object can be automatically modeled.

Next, a bottom-up procedure is executed, in which the relative position-attitude between the sensor and the object and the object kind are predicted from the observation data by the prediction module, as the example of the state prediction value output unit in the recognition process, and a top-down procedure is executed, in which the position module and the visible-invisible module predict the viewing degree of the partial feature and the viewing position of the partial feature observation data based on the prediction value. Then, the difference between the observation data and the prediction results in the top-down procedure is calculated, and the evaluation value of the relative position-attitude between the sensor and the data is modified in order to decrease this difference. Thus, by using a repetitive algorithm in which the bottom-up procedure and the top-down procedure are executed repeatedly, the object can be recognized. In the learning process of the system, the object is automatically modeled, and the relative position-attitude between the sensor and the object is predicted in the recognition process.

BRIEF DESCRIPTION OF THE DRAWINGS

The present invention will be more apparent from the following detailed description in conjunction with the accompanying drawings, in which:

FIG. 3 is a view for explaining data collected by an inference module;

FIG. 7 is a flow-chart for processing in an automatic learning phase;

FIG. 9 is an explanatory view of an output change from a visible-invisible determination module;

DESCRIPTION OF THE PREFERRED EMBODIMENT

We will explain a vision information processing system for picturing cognitive objects and inferring a relative position-attitude between an object and a camera as the preferred embodiment of the present invention.

Figure 1:
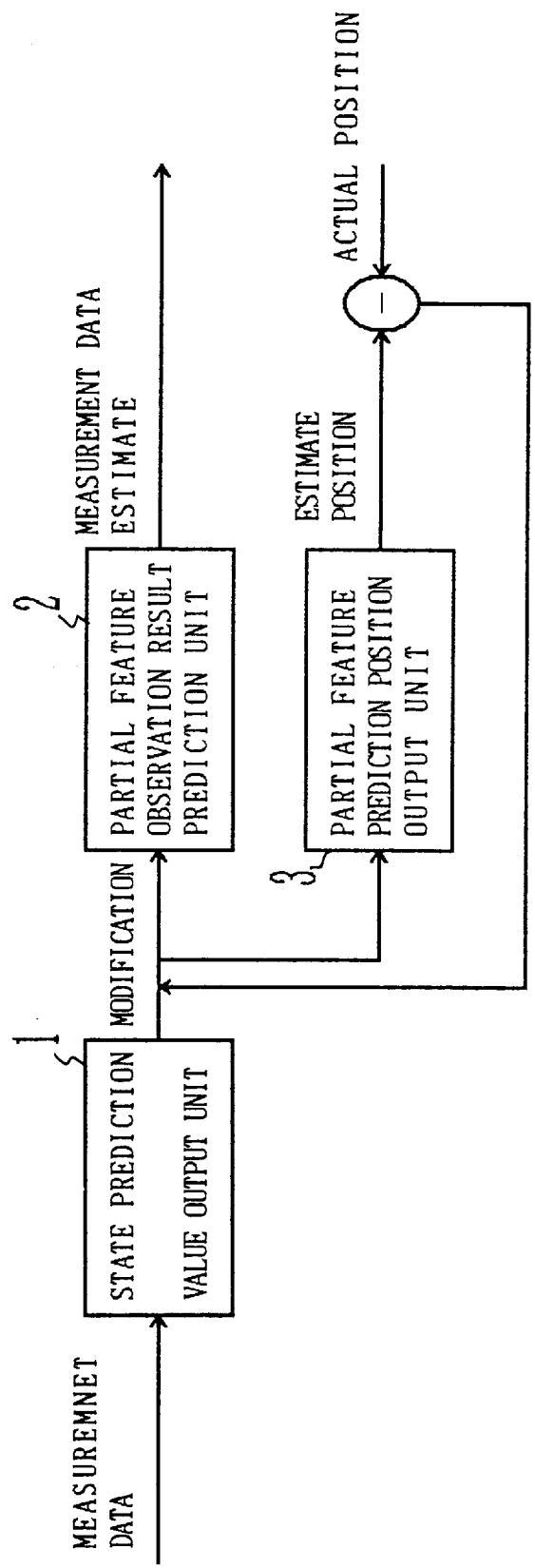
FIG. 1 is a block diagram of the present invention.

FIG. 1 is the principle block diagram of the applicable recognition system of the present invention, for recognizing the objects from the cognitive object observation data, such as sensor data, for example.

A state prediction value output unit 1 is a prediction module, for example, and outputs a targeted condition prediction value based on recognition target observation data, such as sensor data, for example.

A partial feature observation result prediction unit 2 is composed of a plurality of template modules controlled by a template module control unit, for example, and outputs picture element data predictors, such as an observation data predictor of an edge, and others, as a cognitive object partial feature according to the state prediction value input to the partial feature observation result prediction unit 2 from the state prediction value output unit 1.

A partial feature prediction position output unit 3 is a position module, for example, and outputs the predicted position of more than one partial features in picture image data, for example, of cognitive target observation results, according to the state prediction value input to the partial feature observation result prediction unit 2 from the state prediction value output unit 1.

In the present invention, a visible-invisible unit which determines whether the object on the picture image is visible or not, is further provided in order to learn automatically as far as possible, and accelerate the learning of the template module composed of hierarchical neural networks, for example.

In the present invention, the state prediction value output unit 1 such as the prediction module, outputs the relative position-attitude prediction value between the cognitive object and the sensor, such as a camera, from the prediction module, and the prediction value is given to the partial feature observation result prediction unit 2, such as the template module, and the partial feature prediction position output unit 3, such as the position module.

Moreover, the object can be recognized by continuing procedures for modifying the prediction module, as an example of the state prediction value output unit 1, in order to reduce the difference between the position of each partial feature picture image determined based on each template module output corresponding to each partial feature, as an example of the partial feature observation result prediction unit 2, and a prediction position on the partial feature picture image output from the partial feature prediction position output unit 3, as an example of the position module.

Namely, a partial feature view map of how a partial feature can be seen from a relative position-attitude between the object and sensors in the learning process of the applicable system in the present invention is learned by the visible-invisible determination module, as an example of the aforementioned visible-invisible determination unit, and the template module, as an example of the partial feature observation result prediction unit 2, and the automatic modelling of the object is made by a map, from the relative position-attitude between the object and the sensors to a partial feature observation data position, being learned by the position module, as an example of the partial feature prediction position output unit 3.

A bottom-up procedure for estimating the attitude is executed, then a top-down procedure is executed, in which the position module and the visible-invisible determination module predicts a partial feature visibility degree and a partial feature observation data position. Then, the difference between the observation data and the prediction data resulting from the top-down procedure is calculated and the prediction value of the relative position-attitude between the object and the sensor is modified in order to reduce the difference. The object is recognized by using the repetitive algorithm in which the bottom-up procedure and the top-down procedure are repeated alternately.

Then, the object is automatically modeled in the learning process of the system, and the relative position-attitude prediction between the object and the sensor can be executed in the cognitive process.

Figure 2:
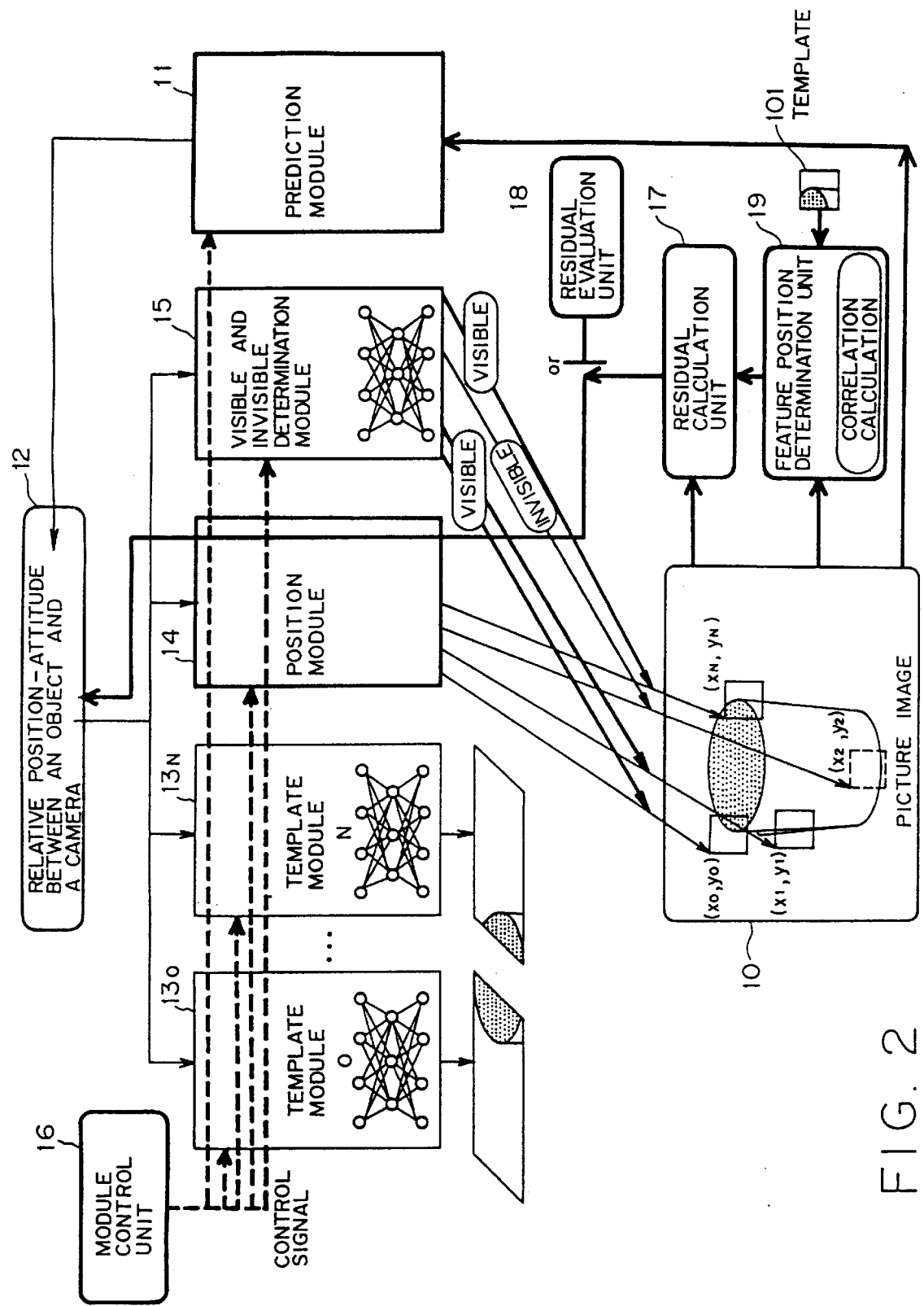
FIG. 2 is a block diagram of the applicable recognition system of the present invention.

FIG. 2 is a general block-diagram of object recognition system components for the preferred embodiment of the present invention. In FIG. 2, the picture data that is the cognitive object is pictured by the camera, and this picture image data is first given to a prediction module 11 as one of a plurality of modules controlled by a module control unit 16. The prediction module 11 is a table in which the relative position-attitude data between the object and the object kind and the camera corresponding to the position or direction of an edge, as an example of an object feature, is acquired by processing of the picture image 10, as described in the latter part of this paper. The contents of the table are stored before the object recognition process, and the relative position-attitude between the object and the camera 12 is output to a visible-invisible determination module 15, a position module 14, and the template modules $13_0$–$13_N$ controlled by the module control unit 16.

The template modules $13_0$–$13_N$ are composed of hierarchical networks respectively. These template modules output each pixel of the partial picture image including each corresponding edge, to input the relative position-attitude between the object and the camera 12.

The position module 14 is composed of a mathematical model, for example, and outputs the prediction position on the picture image for plural partial features, each corresponding to one of the template modules $13_0$–$13_N$. The output of the position module 14 is $(X_0, Y_0)$, as an example of the coordinates at the left point of a picture image containing some partial features, as shown in the picture image 10.

The visible-invisible determination module 15 is composed of hierarchical networks, for example, and outputs the viewing degree of how clearly the partial features, each corresponding to one of the template modules $13_0$–$13_N$, can be seen on the picture image. The number of the output units in this network equals the number of template modules, and the value of "1" is output when each corresponding partial feature can be seen clearly, and the value of "0" is output when each corresponding partial feature cannot be seen clearly.

In the present invention, the initial prediction value of the relative position-attitude between the object and the camera 12 is acquired by the prediction module 11, based on the picture image 10 obtained by the camera when recognizing the object. This initial prediction value is given to the template modules $13_0$–$13_N$ and the position module 14. The feature position is decided by matching based on the correlation calculation between the picture image 10 and a template 101, in a feature position determining unit 19. The residuals, based on the method of least squares in order to recognize the relative position-attitude between the object and the camera, are calculated in a residual calculation unit 17. The residuals are evaluated in a residual evaluation unit 18, and whether or not the residuals should be back-propagated based on the residual value is determined. Then, the partial feature position on the real picture image is extracted by matching template modules $13_0$–$13_N$ with the picture image as a pattern-matching, the partial feature position on the real picture image is compared with the prediction position on the picture image 10 as the output from the position module 14 for the corresponding partial feature, the repetitive algorithm for updating the relative position-attitude prediction between the camera and the object by the prediction module 11 in order for the difference between both positions to be reduced, is applied, and the cognitive object state (kind, position, attitude) is finally inferred.

Here, in the present invention, the prediction module 11, the template modules $13_0$–$13_N$, the position module 14, and the visible-invisible determination module 15, are prepared for each cognitive object. A human face, and mechanical parts such as screws, are examples of the cognitive objects. The initial problem is to recognize the kinds of screws, whose face, and the kind of the car, based on sensor signals such as picture images. Thus, the present invention is suitable for the problem of the cognitive object being identified first, and inferring the position-attitude by identifying which kind of cognitive object it is.

Now, the operation for each module in FIG. 2 will be explained. The prediction module 11 is a table, in which data for the relative position-attitude between the object and the camera and the kinds of the object corresponding to the direction and the position of an edge, as an example of the partial feature, as the processed result from the picture image by photographing the object with the camera as described before, are collected simultaneously when the template modules are learning, and then the collected data are sorted for the recognition process. These modules utilize the methods of generalized Hough translation and Geometric Hashing. The object is recognized by using a contour edge and a form state feature value, such as area or the center of gravity. The contents of these methods are described in the following references.

D. H. Ballard, "Generalizing the Hough transform to detect arbitrary shapes," Pattern Recognition, vol. 13, No. 2, pp. 111–122 (1981).

Y. Lamden and H. J. Wolfson, "Geometric hashing: a general and efficient model-based recognition scheme," in Proc. ICCV 88 Tampa, Fla., pp. 238–249 (1988).

The construction of the inference module is executed in two phases, named data sorting and data collection. Object recognition using the construction of the prediction module 11 will be described in the latter part of this paper relating to the recognition algorithm of the whole system.

In the data collection phase, the state of the relative position-attitude between the object and the camera is set, and the position and the direction on the picture image of the object edge is determined from the picture image photographed in the set condition. Then, the procedure for these steps is repeated after changing the relative position-attitude between the object and the camera with the object being the same. Further, the direction $d_i$ on the edge picture image (an angle between the picture image coordinate system and a line between the edge and the origin on the picture image, for example) and the coordinates $(x_i, y_i)$ of each edge of the object A,B, . . . corresponding to the relative position-attitude (pose) P, P', . . . between the object and the camera, and the object (category), for example, A,B, . . . , by repeating these steps after changing the object, are determined. Subsequently, as shown in FIG. 3, data are collected for the direction and the position of the plural edge picture image for each object, corresponding to the category and the pose.

In the subsequent data sorting phase, a list is created, in which combinational data, such as [A, P], for example, data combined with the pose, such as the relative position-attitude between the object and the camera, and the category, such as the object to which the edge may belong, corresponds to data $(x_k, y_k, d_k)$ for the direction and the position on the picture image of some edge, such as the partial features within the picture image developed in data collection.

Now, a set of data $(x_i, y_i, d_i)$ is selected from among N edges data of the object within the picture image in which a category A object is photographed under the relative position-attitude state for the pose "P, " and all other N−1 edges $(x_j, y_j, d_j, j \neq i)$ of the coordinate systems in which the origin is $(x_i, y_i)$, and the direction for "$d_i$" is the direction of the X axis, are represented. By executing these procedures for all N edges, the N(N−1) data $(x_k, y_k, d_k)$ are acquired corresponding to the category A and the pose P. Namely, the following expression is derived representing a plurality of data N(N−1) correlation data points between the category A and the pose P.

$$(x_k, y_k, d_k) \rightarrow [A,P](K=1,2, \ldots, N(N-1))$$

Similarly, the N(N−1) correlation is derived when the number of the object partial features for each category is N, for the combination of all the categories and the poses.

Thus, after the N(N−1) correlation for each combination of each category and each pose is derived, when the combinational data corresponding to $(x_k, y_k, d_k)$ are added, as shown in the following expression, if $(x_k, y_k, d_k)$ corresponding to [A, P], for example, and $(x_i, y_i, d_i)$ corresponding to [B, P'], for example, are equal, in other words, when $(x_k, y_k, d_k)=(x_i, y_i, d_i)$ is established.

$$(x_k, y_k, d_k) \rightarrow [A,P] \rightarrow [B,P'])$$

When this type of procedure is applied to all data, a table is developed, in which a list of —[A,P]→[B,P'][C, P'']→— . . . corresponding to the key of $(x_k, y_k, d_k)$ is stored, as shown in FIG. 3.

Then, learning by the other modules in FIG. 2 is explained. The module learning is explained in general here, whereas learning by the position module 14 is described in the latter part of this specification, because the template modules $13_0$–$13_N$ and the visible-invisible determination module 15, among all the modules in FIG. 2, are composed of the hierarchical neural networks.

The first necessary state when automatically obtaining the object model by learning is to make each partial feature easy to be found when observed from any point of view. The second state is to automatically obtain the relationship between the way of viewing of each partial object and the observing point without using operator effort, as far as possible. The third state is to learn as quickly as possible.

To achieve the first state, the object may be observed from many points of view, and a user may teach correlation between observing points for each partial feature. However, these approaches will cause contradiction of the second and third state. Accordingly, in the present invention, this problem is resolved by using the visible-invisible determination module 15 in order to predict the reliability of the learning results, and for dividing learning into the preparation learning phase and the automatic learning phase.

Namely, the user makes the system learn features that the user has selected from the observing points that the user selected in the preparation learning phase, while the system learns automatically in the automatic learning phase by selecting the observing points and the partial features based on the learning results from the preparation learning phase. Further, learning is made without selecting ineffective and wrong learning patterns by using the visible-invisible determination module 15. At this point, a back-propagation method is used as the learning algorithm of the hierarchical neural network, and correlation template matching is used as a method for detecting the partial features from the picture image.

Figure 4:
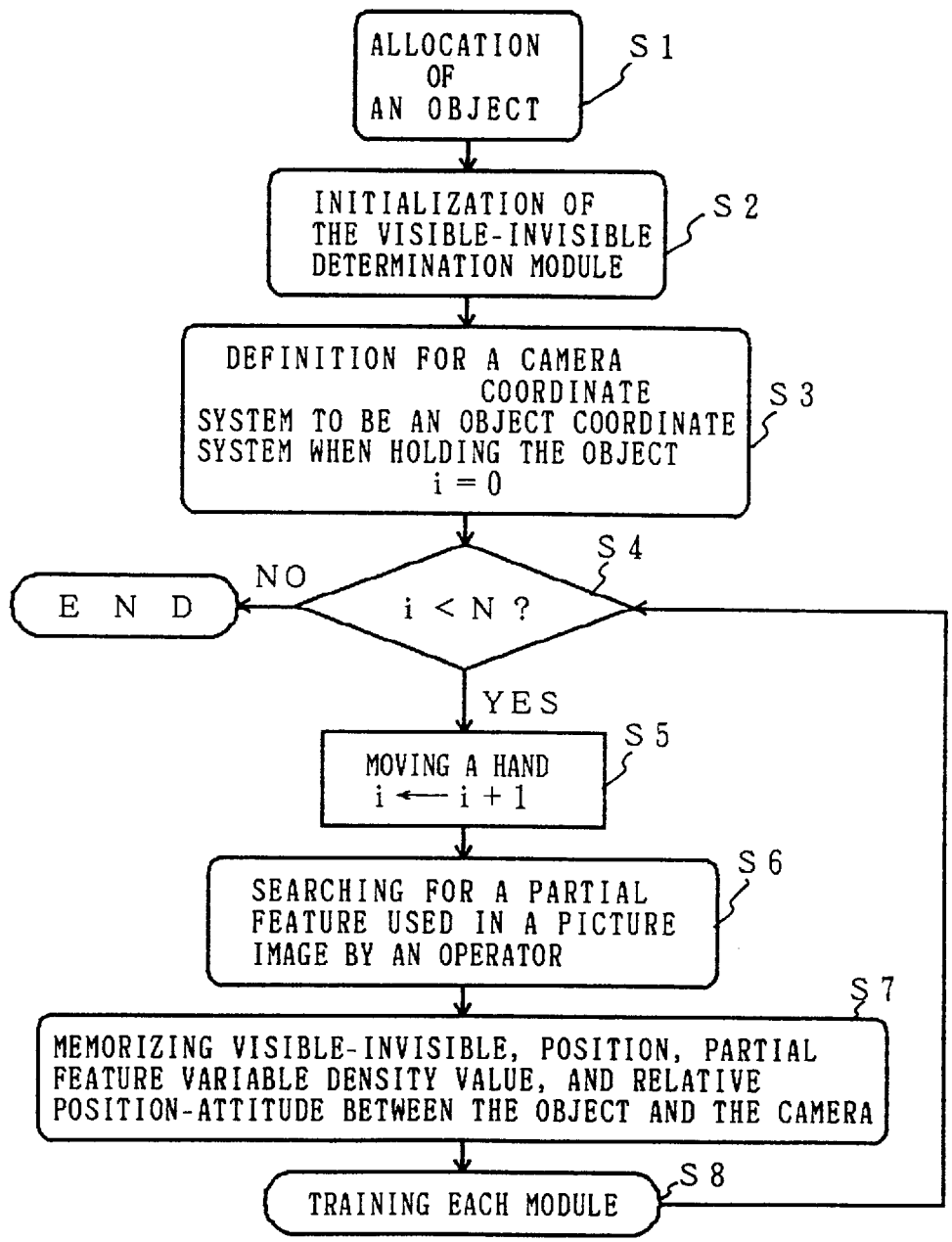
FIG. 4 is a flow-chart for a preparation learning phase.
Figure 5:
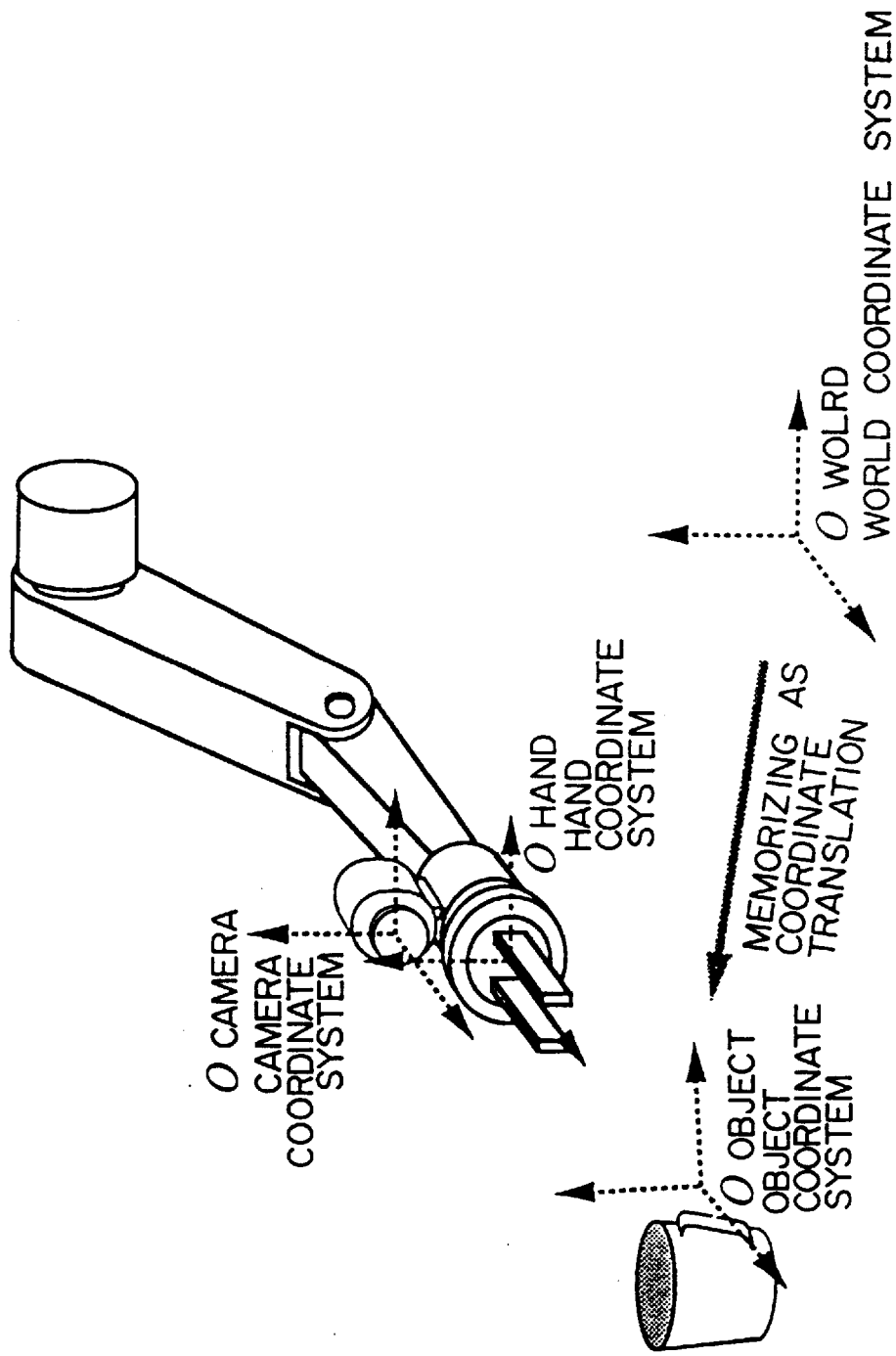
FIG. 5 is a view explaining the definition of an object coordinate system in a pre-learning phase.
Figure 6:
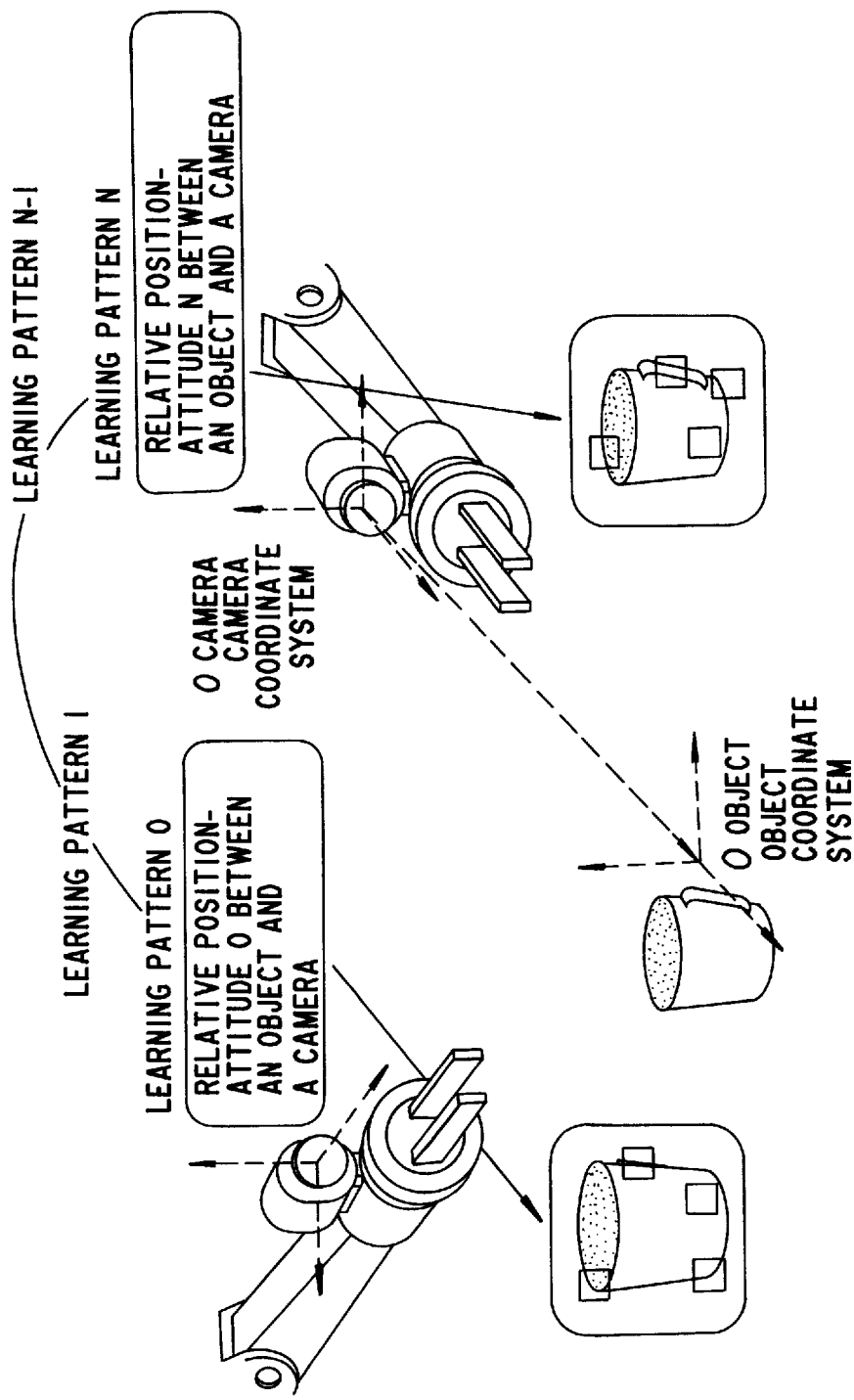
FIG. 6 is a view explaining a selection method of a learning pattern in a pre-learning phase.

FIG. 4 is a process flowchart in the preparation learning phase. FIG. 5 is an explanatory view of the definition for the object coordinate system in the preparation learning phase. FIG. 6 is an explanatory view of a way of selecting a learning pattern. A procedure for the preparation learning phase is explained by referring to these figures.

In FIG. 4, at first, a learning object is prepared in a step S1, and the object is placed in a suitable position. Then, the visible-invisible determination module 15 is initialized in a step S2. In this initialization, the output from the output layer unit, which outputs the decision value for whether or not each object partial feature is seen, is set to 0.5, which represents the ambiguous state of seeing or not seeing.

In a step S3, in the state for a robot hand to hold an object, a camera coordinate system is defined to be an object coordinate system (the hand position for this state is the origin, and the directions parallel to each axis of the camera coordinate system are defined as the coordinate system), and the origin and the attitude of the object coordinate system in the world coordinate system are stored. In FIG. 5, the object is not held by the hand, but the object coordinate system is defined as the state of holding the object in the hand. This definition method is just an example, and it necessarily points to defining the coordinate system fixed to the object in some way. In the step 3, a hand movement number "i" is set to 0 as described, after the definition of the object coordinate system, then a step S4 is executed.

The reason why the object coordinate system position and the attitude in the world coordinate system are stored, is because of the need to use them when seeking the relative position-attitude between the object coordinate system and the camera coordinate system. The position and the attitude of the robot fix coordinate system are already known, and the position and the attitude of the camera coordinate system in the world coordinate system can be determined if conversion from the robot fix coordinate system to a hand coordinate system, and conversion from the hand coordinate system to the camera coordinate system, are already known. The relative position and the attitude between the object coordinate system and the camera coordinate system can be calculated with the world coordinate system as a parameter, by using the position and the attitude of the object coordinate system in the world coordinate system.

In a preparation learning phase step S4, it is examined whether or not the hand movement number "i" has reached the predetermined number "N," and the value of "i" is incremented and the hand is moved in a step S5, when the predetermined number is not reached. In a step S6, the partial feature used for learning is searched for in the picture image by the user. In a step S7, data for partial feature visibility-invisibility, the partial feature position, the pixel density in the partial picture image corresponding to the partial feature, and the relative position-attitude between the camera and the object are stored, then each module is trained in a step S8 by using these data.

FIG. 6 is a view showing a way of selecting a learning pattern in a preparation-learning phase. By moving the hand and getting the picture image of the object by the camera from the movement position, the data explained in the step S7 are stored, then each module is trained in the step S8 by using the learning pattern "0". Learning is finished at the time when the hand movement number reaches the predetermined number "N". Here, there is no specific method for setting the value of "N", it is set heuristically according to the identification accuracy required for the position and the attitude.

FIG. 7 is a view showing a flow-chart for processing in an automatic learning phase. In FIG. 7, one of the partial features is selected in a step S10. Then, in a step S11, a comparison is made to decide whether or not a value of a position-attitude region cube, in which an output from the visible-invisible module is in the range of 0.2 to 0.8, is larger than the predetermined value S. Here, the meaning of the output from the module being in the range of 0.2 to 0.8 is that the output from the module is close to 0.5, and therefore it is indeterminate whether the selected partial feature can be seen or not. Further, for the position-attitude region cube, it is also meant that the position-attitude can be represented by six variables, when the position-attitude can be acquired in 3-dimensional space, as a region, in which it is indeterminate whether the selected partial feature corresponding to each variable can be seen or not, which is represented as a cube of n=6 dimensional space. A step S12 is executed when the value of the cube is greater than the predetermined number, in other words, when the region, in which it is indeterminate whether the selected partial feature can be seen or not, is wide. In the step S12, the relative position-attitude, in which the module output is 0.8, is obtained by changing the input value for the visible-invisible determination module 15, for example. The meaning that the module output becomes 0.8 is that the selected feature can be roughly seen, and the position and the attitude generating this kind of value from the visible-invisible module between the position and the camera, are required. In a step S13, the camera is moved to this position-attitude, and the position-attitude value is input to each module.

In a step S14, a partial feature search on the picture image is executed by using the template module output. Here, the meaning of the output of the visible-invisible determination module 15 reaching 0.8 is that because the template module output reliability is high, this output is treated as being almost equal to the detection of a partial feature of the cognitive object. The template module output corresponding to the selected features is used exclusively, and any other template module output is not used when this partial feature can be seen by searching a pattern, such as the partial data best fitting to this output, among the picture images.

As a result of the relative matching with the template module, in a step S15, a comparison for determining whether or not the maximum relative value is below 0.9 is made. If the maximum relative value is not less than 0.9, the procedure for this position-attitude is terminated, as this position-attitude has already been learned at the preparation learning phase, and the procedures after the step S12 are repeated.

A comparison for determining whether or not the maximum relative value is greater than 0.7 is made in a step S16, when the comparison determines that the maximum relative value is less than 0.9 in the step 15. For these cases, the maximum relative value is between 0.7 and 0.9. Data "1", which designates the partial feature, the partial feature position, and each gray-scale of pixel corresponding to the partial feature and the relative position-attitude between the camera and the object, are stored in a step S17, because learning corresponding to this position-attitude should be made, and each module is trained in a step S18, then the procedure returns to the step S11.

A comparison to determine whether or not the maximum relative value is less than 0.5 is made in a step S20, when a comparison is made in the step S16, in which the maximum relative value is not greater than 0.7. A learning pattern corresponding to this position-attitude results in a wrong learning pattern, because there is no agreement with the corresponding partial feature as to whether or not this partial feature is judged as visible, when the maximum correlation is less than 0.5. Thus, in a step S21, only the visible-invisible determination module is trained to show invisible, such as output "0", from the corresponding output unit, then the procedure returns to the step S12. If the comparison in step S20 determines that the maximum correlation is not less than 0.5, the maximum correlation is between 0.5 and 0.7 whether or not the partial feature is determined as visible, and a reliable learning pattern is judged as impossible to achieve, then the procedure returns to the step S12.

If the comparison in the step S11 determines that the value of the cube of the position-attitude, for which the visible-invisible module output is between 0.2 and 0.8, is less than S, the module is trained for the visible-invisible output to become "0" for the position-attitude for which the visible-invisible module output is less than 0.7 in a step S22, then steps following the step S11 are executed.

The visible-invisible determination module is used for preventing a wrong learning pattern or an unsuitable learning pattern as described above, and for learning effectively. To reduce a learning time, it is desirable for the unsuitable learning pattern not to be used. There are two partial feature viewing ways, namely the practical changeless way and the dynamic change way. By using these ways, a learning pattern is acquired from only as small a number of observation points as possible is acquired. However, corresponding partial features cannot be found only by using the learning results up to now, when the partial features change dynamically by changing observation points, and a wrong learning pattern, matched to other parts inside the picture image, may be acquired. The visible-invisible module is provided to resolve this type of tradeoff, and the operations thereof are explained in detail using FIG. 8 to FIG. 10.

Figure 8:
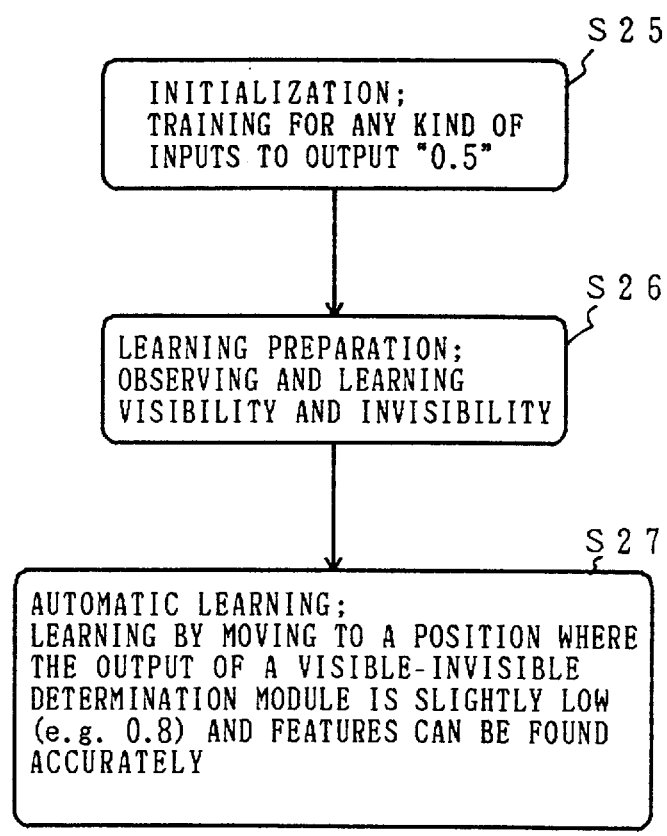
FIG. 8 is a flow-chart for a learning process of a visible-invisible module.

FIG. 8 is a flow-chart showing a learning process of the visible-invisible module. In FIG. 8, the visible-invisible module is initialized in a step S25. At this time, it is not determined whether or not each partial feature can be seen. Thus, initialization is made in order for the module output unit to output 0.5 for each input, as described before.

Then, preparation learning, that is, learning in the preparation learning phase described before, is processed in a step 26. In this step, it is observed whether each feature point is visible or invisible, and module learning is made according to this result. After this learning phase, the partial feature can be determined accurately for the view point, in which a visible-invisible module output is "1," by correlation between the picture image data and the template module output. The partial feature can be determined accurately for observation points for which the module output is 0.8, for example, which is nearly equal to "1", although determination reliability becomes lower.

In a step S27, the automatic learning, as learning in the automatic learning phase described before, is executed. Namely, learning is made corresponding to observation points, in which the partial feature can be determined accurately, although the visible-invisible module output is low, such as 0.8, and learning of highly reliable observation points, based mainly on observation points captured in the step 26 of the preparation learning, by repeating this learning phase, is processed successively. Namely, an unidentified region can be reduced little by little in order for the visible-invisible output to become nearly 0.5, without capturing the wrong learning pattern. Accordingly, ambiguity, in which it is uncertain whether the partial feature is visible or invisible, becomes rare when a suitable observation point is designated, and the feature becomes able to be determined accurately when visible.

FIG. 9 is an explanatory view of an output change from a visible-invisible module. FIG. 9A shows output after initialization, and initialization is made in order for the module output to become nearly 0.5 whatever the value is of the relative position-attitude between the object and the camera, which is one variable in this case.

FIG. 9B is a graph showing output after the preparation learning phase. The symbol o means a learning point in the preparation learning phase. Output is "1" for visible and "0" for invisible. In the range between 0.2 and 0.8, it is not clearly judged whether the position feature is visible or invisible, and the value of the relative position-attitude corresponding to such output value is left as an unidentified region.

FIG. 9C is a graph showing output under the automatic learning phase. By learning the situation having an output value greater than 0.8, the process is shown in which the range of the relative position-attitude, corresponding to the unidentified region in which it is uncertain whether it is visible or invisible, is being restricted.

FIG. 9D is a graph showing output after the automatic learning phase. The position-attitude region corresponding to the unidentified region, in which it is uncertain whether the position feature is visible or invisible, is moderately narrower than that after the preparation learning phase in FIG. 9B.

Figure 10:
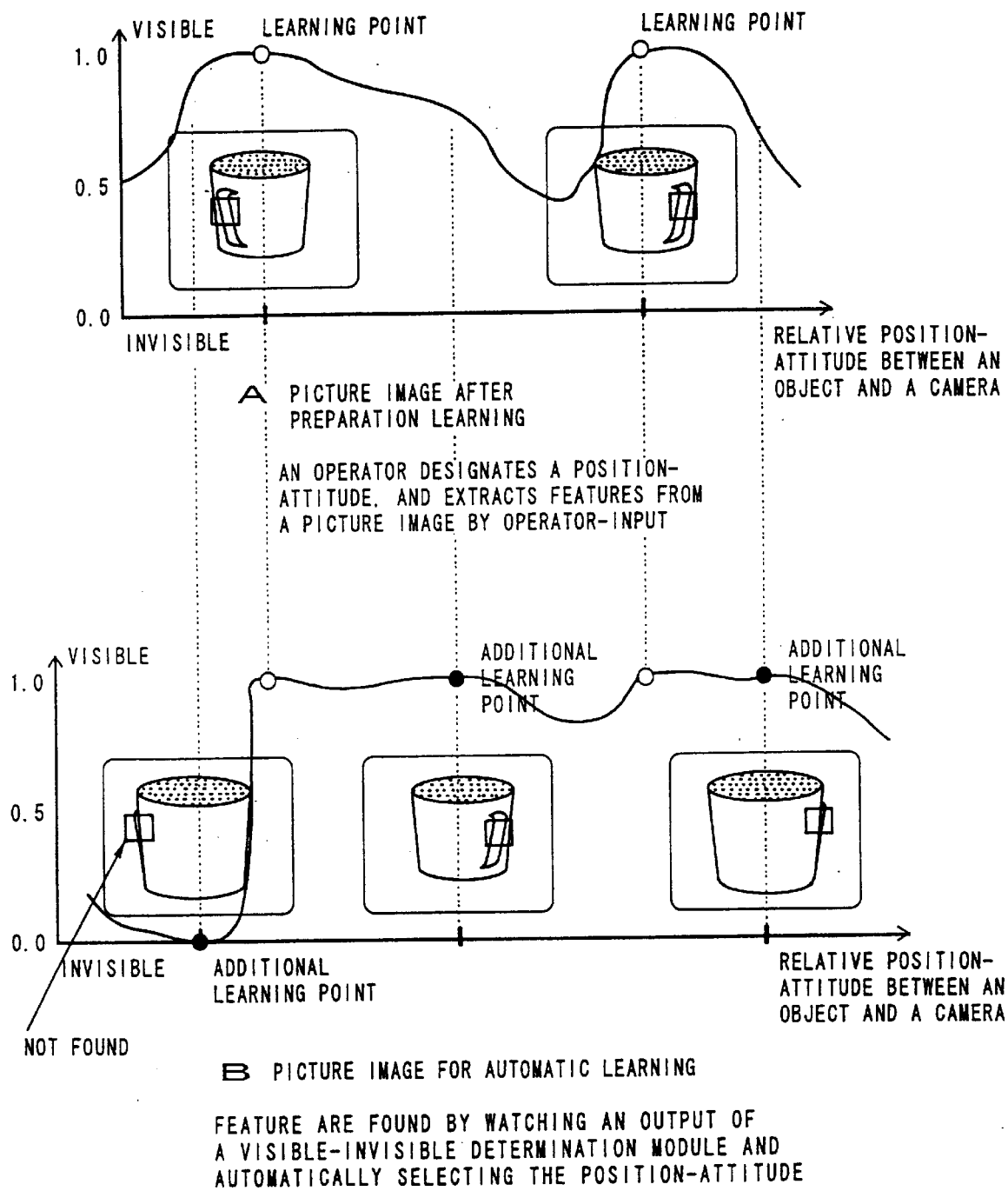
FIG. 10 is an explanatory view of a picture image used in a preparation learning and an automatic learning.

FIG. 10 is an explanatory view showing the picture image used in the automatic learning and the preparation learning phases. FIG. 10A shows an example of the picture image used in the preparation learning phase, and learning is processed by extracting a partial feature from the picture image by operator input, and designating of the relative position-attitude between the object and the camera by the user.

On the other hand, FIG. 10B is a graph showing the picture image used in the automatic learning phase. The points, at which output is relatively larger or remains the same, are automatically selected as additional learning points, then the additional learning points are processed.

Figure 11:
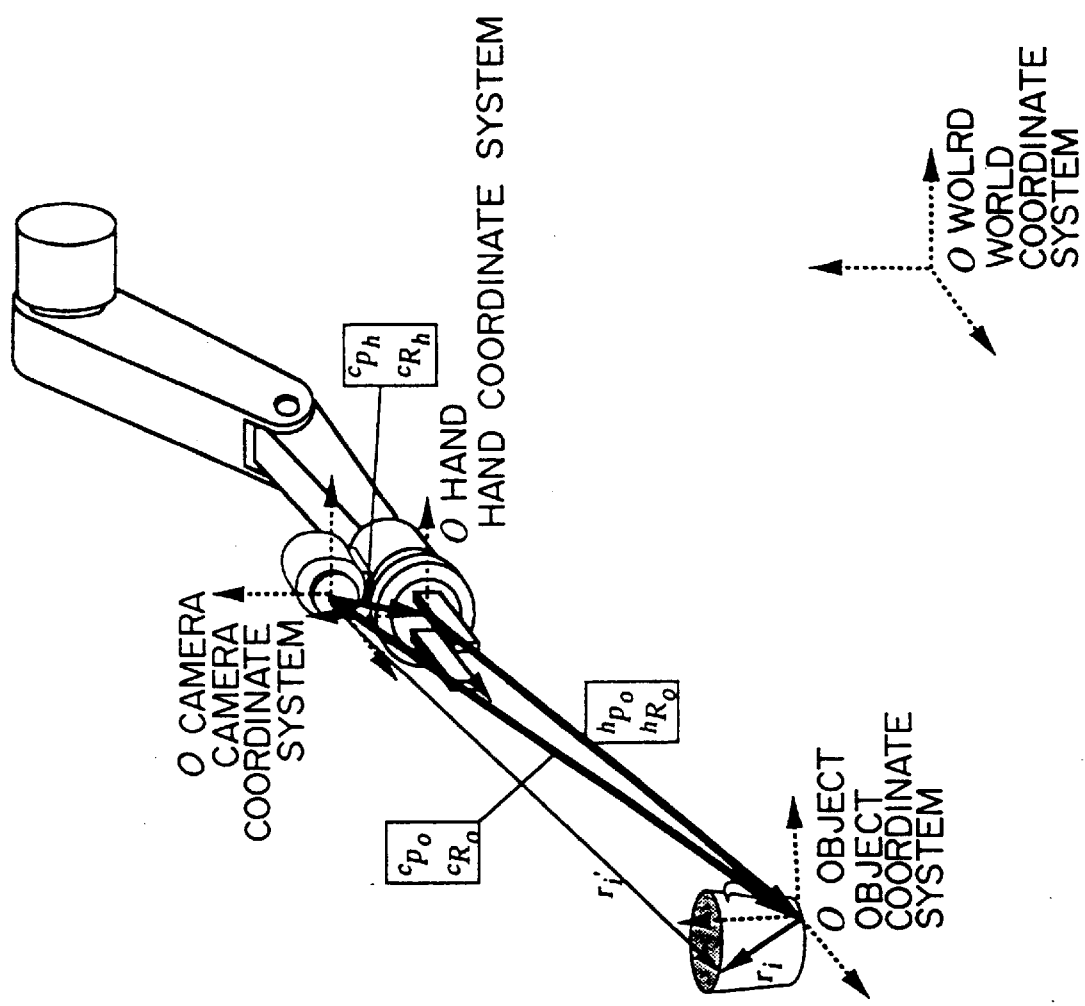
FIG. 11 is an explanatory view of coordinate conversion used in a position module.

Next, the operation of the position module is explained. Beforehand, the conversion of the coordinate system used in the position module will be explained by using FIG. 11. In FIG. 11, the translational elements are represented by "P" and the rotational elements are represented by a rotational matrix "R". For example, in FIG. 11, $^cP_h$ represents the position for a hand coordinate system, and $^cR_h$ represents the attitude for the hand coordinate system in the camera coordinate system.

Figure 12:
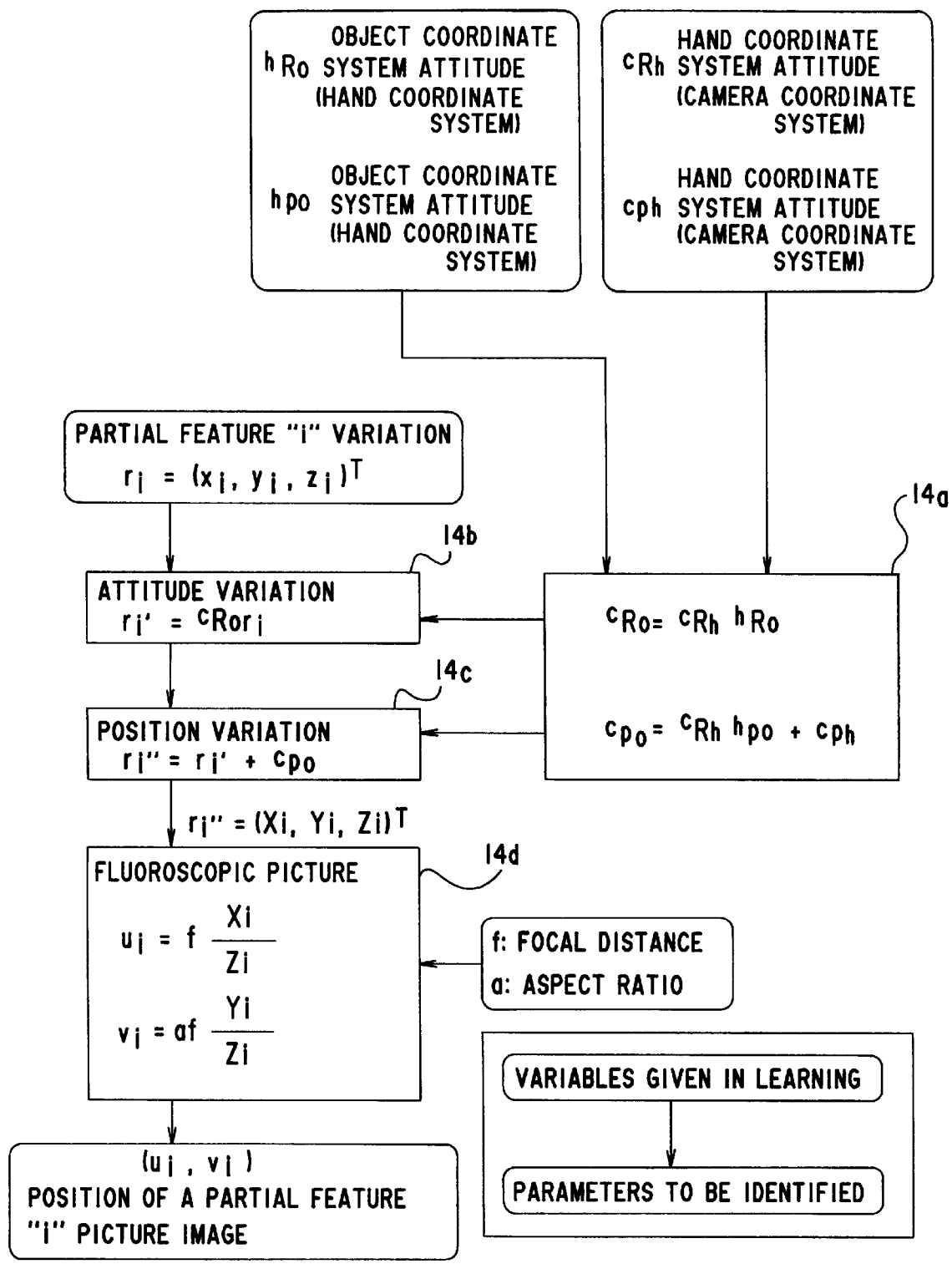
FIG. 12 is an explanatory view of a position module operation in learning.

FIG. 12 is an explanatory view showing position module operation in learning. In FIG. 12, expressions 14a are for obtaining the position-attitude of the object coordinate system for these kinds of mathematical relations.

Expression 14b is for obtaining an attitude variation (rotation) by using an attitude of the object coordinate system in the camera coordinate system obtained in 14a, and the position of the partial feature "i" represented by the object coordinate system.

An expression 14c is for obtaining a position variation (translation) by using the attitude variation obtained in 14b, and the position for the object coordinate system in the camera coordinate system obtained in 14a.

Expressions 14d are for obtaining a position on the picture image of a partial feature "i" as a picture image coordinate in a fluoroscopy project, by using an aspect ratio (the ratio of longitudinal length to lateral length), the focal distance, and the position variation obtained in the expression 14c.

The position (picture coordinate) on the picture image of the partial image "i" of the cognitive object, and the position-attitude of the object coordinate of the hand coordinate system, are given for the position module learning process, and the position of the partial feature "i" represented by the object coordinate, the position-attitude of the hand coordinate system in the camera coordinate system, the focal point of the camera, and the aspect ratio, are identified. Namely, by simultaneously solving a number of equations corresponding to a number of parameters to be identified, these parameters can be obtained. However, these parameter estimations are made by using the method of least squares as described later, because a greater number of data than the least necessary number of data for generally determining parameters can be obtained.

Figure 13:
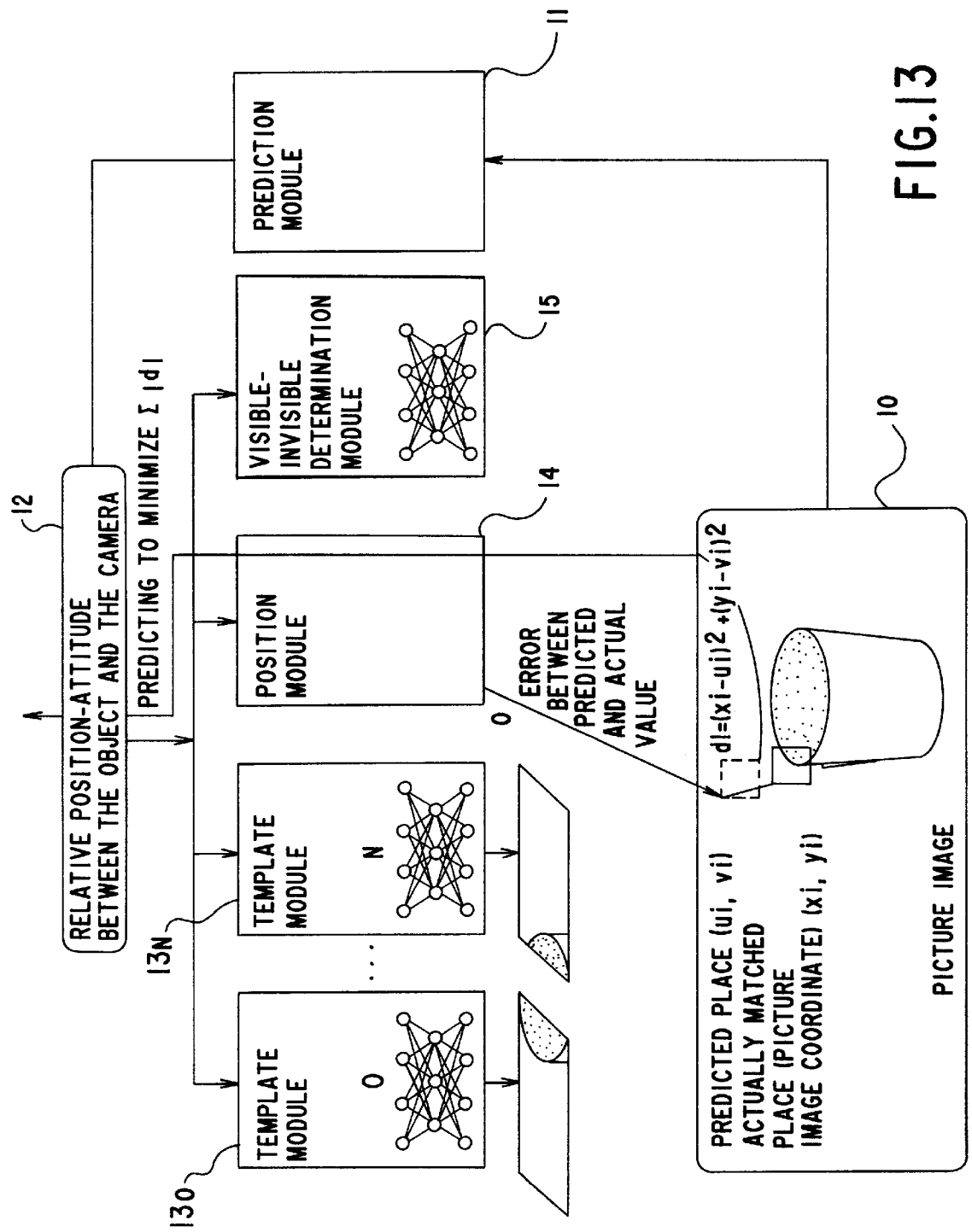
FIG. 13 is a general explanatory view of a relative position-attitude inference method between an object and a camera in recognizing.

Next, the operation for recognizing is explained. FIG. 13 is an general explanatory view of a relative position-attitude inference method between the object and the camera for recognizing. As described before, the relative position-attitude between the object and the camera 12 is output from the prediction module 11, this value is a prediction value, but is not the right value from the beginning. In all cases, this prediction value is given to the template modules $13_0$–$13_N$, the position module 14, and the visible-invisible determination module 15, the position for each partial feature output from the template module is searched on the picture image 10, an actual matching position and a corresponding predictive position for each partial position output from the position module 14 are mutually compared on a picture image coordinate, and successive operations after the output of the relative position-attitude between the object and the camera 12 by the prediction module 11 are repeated in order for an error (square error) between these to become the smallest.

Figure 14:
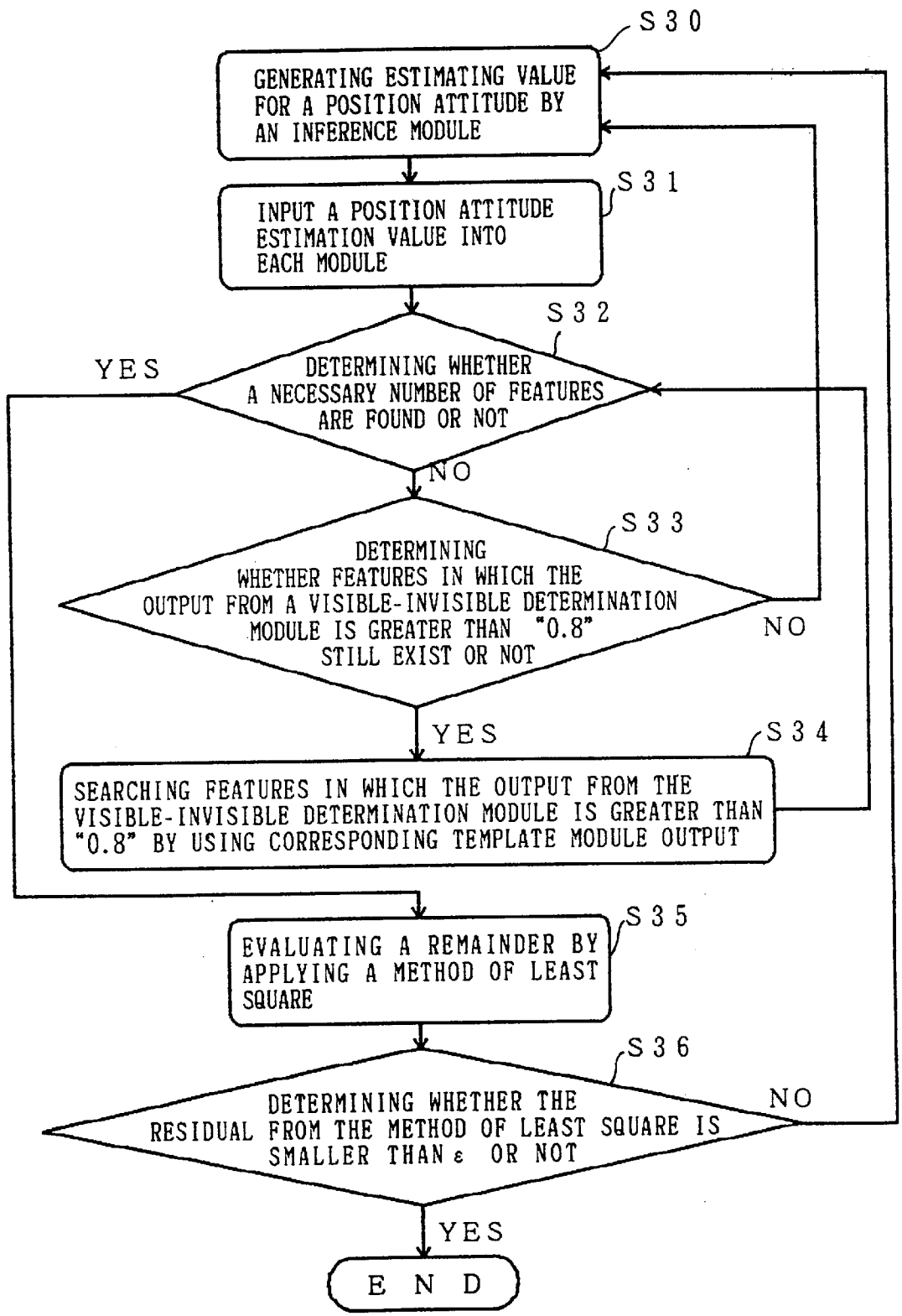
FIG. 14 is a general flow-chart in recognizing a targeted object.

FIG. 14 is a general flow-chart for recognizing a targeted object. At first, an initial prediction value of the relative position-attitude between the object and the camera 12 by the prediction module 11 is generated at a step S30, and this prediction value is given to the template modules $13_0$–$13_N$, the position module 14, and the visible-invisible determination module 15 at a step S31.

Then, a comparison to determine whether or not a necessary number of partial features are obtained is made in order to apply the method of least squares at a step S32. In a step S33, a comparison is made to determine whether or not the partial feature, in which the output of the visible-invisible determination module is greater than 0.8, and the partial features which can be judged as visible still exist, if yes, then the partial features, in which the output from the visible-invisible determination module is greater than 0.8, are searched by using corresponding module outputs at a step S34, and then the step S32 is executed.

The residual (the evaluation function to be described later) is predicted by applying the method of least squares at a step S35 when a necessary number of partial features for applying the method of least square are found at the step S32. A comparison to determine whether or not the residual is less than a predetermined fix value "E" is made, and the output from the prediction module 11 is recognized, as a result, as the relative position-attitude between the camera and the object, which the output from the prediction module 11 should obtain if the residual is smaller, and this process flow is terminated.

When the residual from the method of least squares determined as not being less than the predetermined value "$\epsilon$" at a step S36, or it is determined that the partial feature, for which the output from visible-invisible determination module is greater than 0.8, cannot be found before the necessary number of the partial features is not found at the step S33, the step S30 is executed, and the following steps after the procedure of generating a prediction value for the relative position-attitude between the object and the camera 12 by the prediction module 11, are executed.

Figure 15:
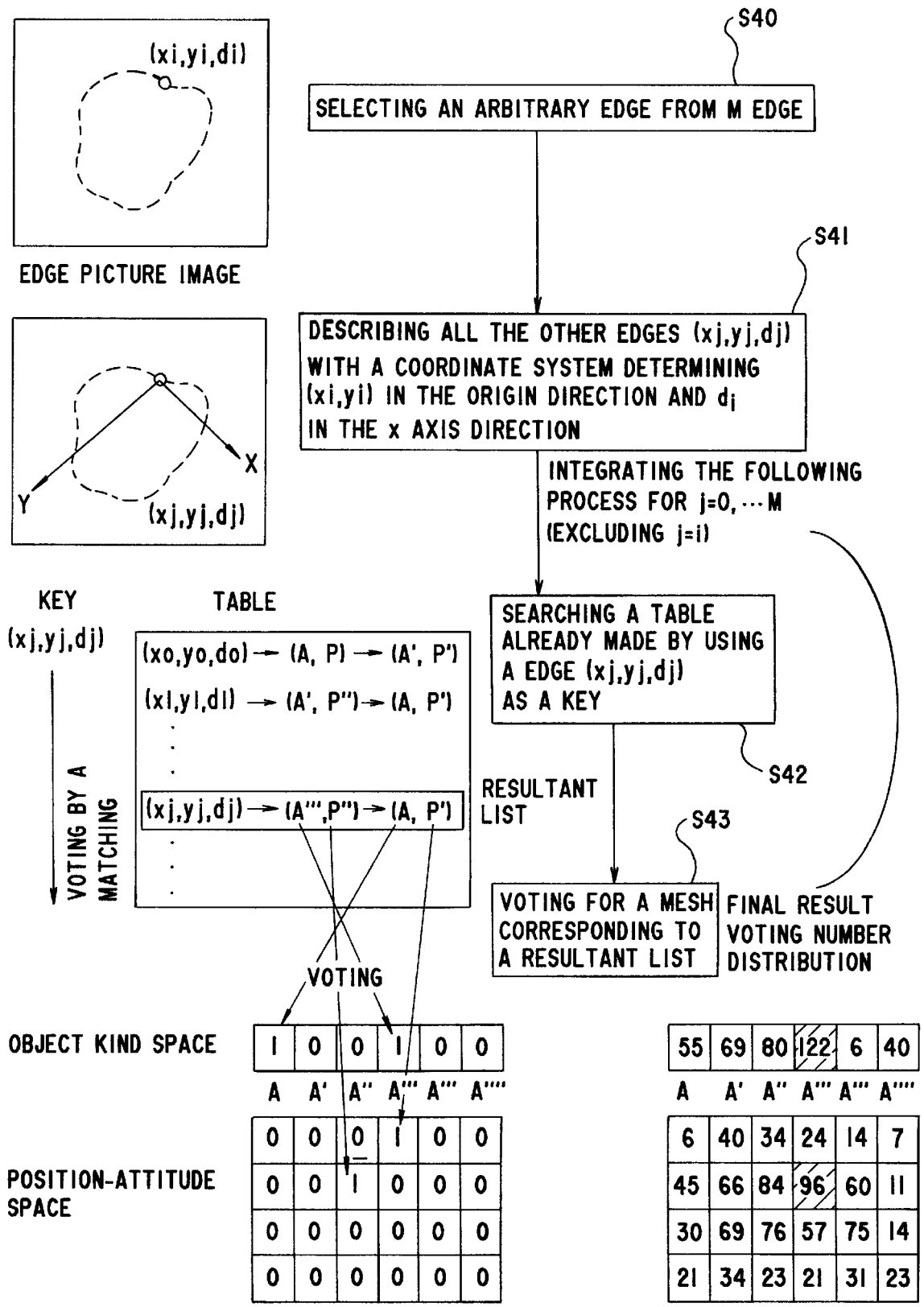
FIG. 15 is an explanatory view of an inference module operation in recognizing.

Next, operation for each module in recognizing is explained. FIG. 15 is an explanatory view of a prediction module operation in recognizing. FIG. 15 is a view showing the prediction module for using an edge coordinate as the partial feature extracted from the picture image of the cognitive object, searching the table in which data (list) as explained in FIG. 3, etc. are stored, and getting a prediction value for the relative position-attitude between the camera and the object according to this result.

In FIG. 15, one of M edges extracted from the picture image at a step S40 is selected arbitrarily. Then, in a step S41, by using a coordinate system, in which $(x_i, y_i)$ is determined as the origin, and $d_i$ is determined as the distance from the origin in the X axis direction $(x_i, y_i, d_i)$ and an edge position, and other M–1 edges $(x_j, y_j, d_y)$ are represented. As a result, M–1 $(x_k, y_k, d_k)$ can be obtained.

Then, in a step S42, the table contents already made are searched by using M–1 edges $(x_k, y_k, d_k)$ as keys, respectively. These table contents are lists of data combined by a category and a pose, that is, the relative position-attitude between the camera, the object, and the kind of the object corresponding to the edge as described before, and a vote to a corresponding mesh in a step S43 is made by using an obtained list corresponding to a key.

Namely, at first, the vote to the mesh, in which the spaces for the kind of the object are made, is made corresponding to the category for combination data for each obtained list, then the vote to the space for the position-attitude is made. The space for six variables is created by the mesh when a 3-dimensional object, for example, is recognized as the position-attitude space, but, in this case as an example, a space created by the mesh as a 2-dimensional space corresponding to two variables among them, is illustrated here.

By repeating these types of procedures, in which M–1 edges are used as the keys, respectively, and supposing that vote numbers shown in the table in the lower right hand corner in FIG. 15, for example, are finally obtained, the central value in which the number of the votes is large enough or the maximum, can be output at the step S30 in FIG. 14 as the prediction value of the relative position-attitude between the object, the camera, and the kind of the object.

Here, in FIG. 15, the number of divisions of the mesh in the position-attitude space, for example, means that the mesh is judged as being equal to the pose corresponding to the pose partition, but the precision of agreement judgement is determined by the necessary precision for a given task. For example, the precision for agreement judgement should be determined in order for the necessary precision to be realized if one degree of precision, for example, is required as the degree of precision. There is no general method for a practical determination, so it is determined heuristically by using a prepared experiment, for example.

Figure 16:
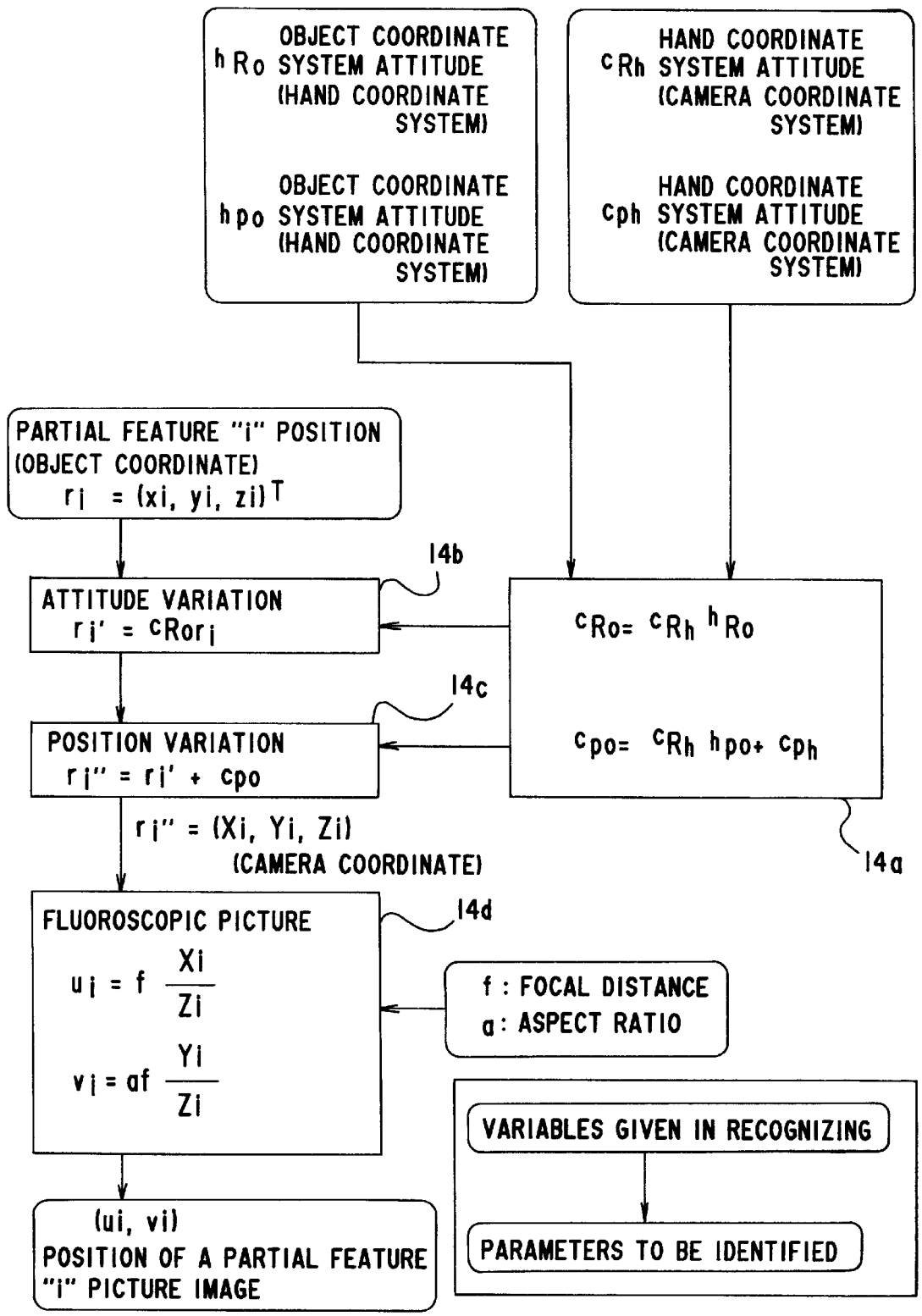
FIG. 16 is an explanatory view of a position module operation in recognizing.

FIG. 16 is an explanatory view of the position module 14 operation in recognizing. In FIG. 16, expressions 14a–14d used as the position module are the same as those of FIG. 12.

The partial feature positions in the object coordinate system are first input to the position module 14 for recognizing. The partial feature position is identified in learning, and the identified value is given. The partial feature position predicted in learning is a partial feature coordinate in the object coordinate system related to the object, and this value can be used in recognizing as long as the object is not deformed. Namely, the identification of the partial feature position is made for each object modeling, and usually made in learning.

The second input is the position-attitude of the hand coordinate system in the camera coordinate system. This value is constant after the camera is attached to a robot hand, and the value identified in learning can be used. The third input is the aspect ratio and the camera's focal distance, and these are also identified in learning.

The fourth input is the prediction value for the position-attitude of the object coordinate system in the hand coordinate system, and is given to the position module by converting the camera coordinate system to the hand coordinate system by using the relative position-attitude between the camera and the object, that is, the output from the prediction module 11.

The output from the position module 14 in learning is the estimation position (picture image coordinate) on the picture image of the partial feature of the cognitive object. The partial feature position is searched on the picture image by using the output from the template module around the predicted position of the partial feature, that is, the output of the position module 14. Generally speaking, the partial feature position on the picture image is different from the predicted position, so that the position-attitude, for the object coordinate system in the hand coordinate system as one input to the position module 14 in order to eliminate the difference between them, will be modified. Thus, operations in which the position-attitude of the object coordinate system as one input is identified, are processed by using the errors in the output.

Learning of the position module will be further explained here. Learning of the position module is made by using data collected in the preparation learning phase. Accordingly, the order for learning is the preparation learning phase, first, position module learning, second, template module learning, third, and the automatic learning phase, fourth. In template module learning, learning is made by using data collected in the preparation learning phase, and learning continues further by collecting data in the automatic learning phase.

The cognitive system in the present invention is a model-based cognitive system for identifying the position-attitude and recognizing the object by using the object model provided to the system. To predict the object coordinate system of the partial feature of the object in learning means in obtaining the object model, and to obtain the model in learning, is quite normal.

Figure 17:
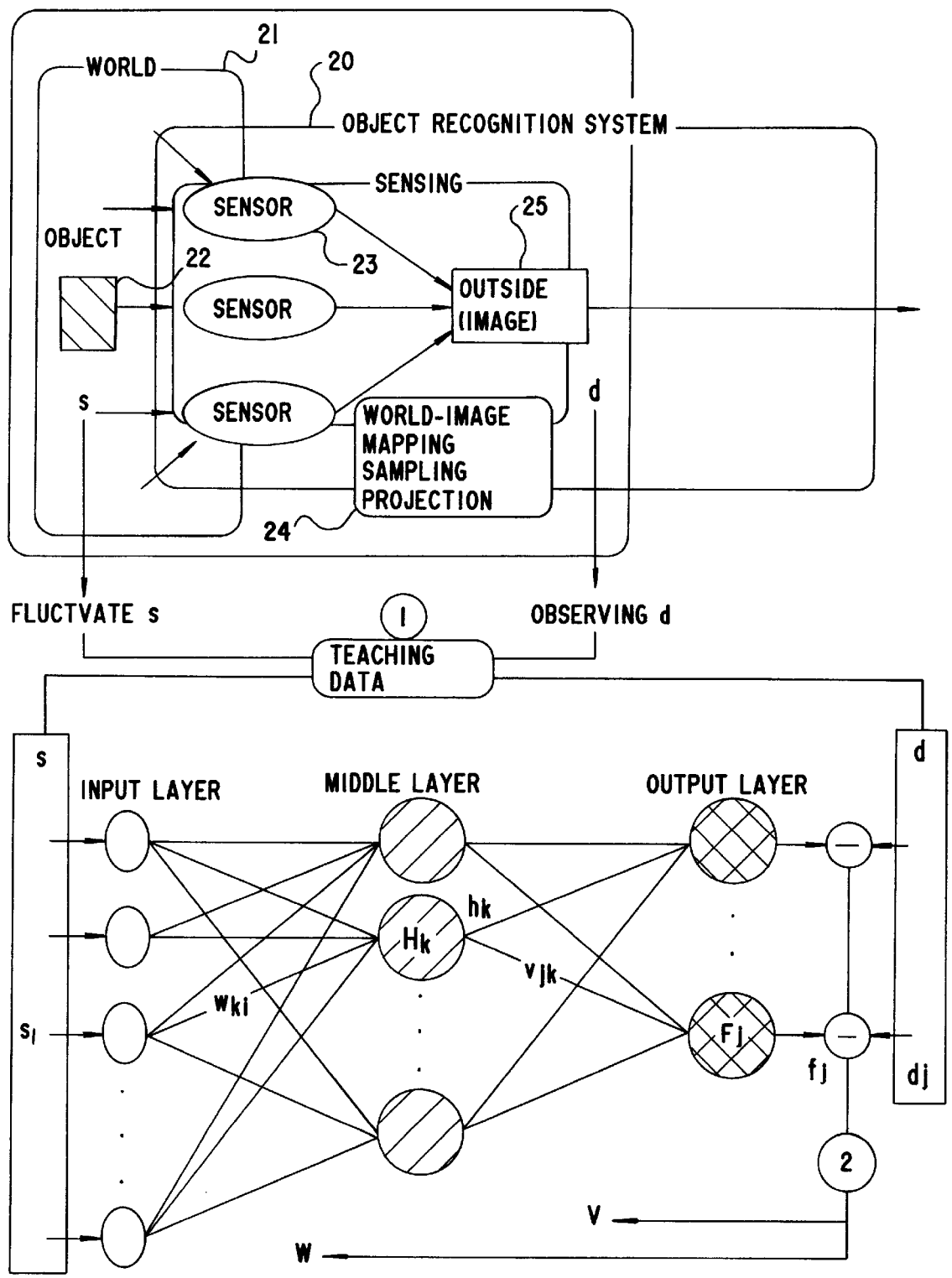
FIG. 17 is an explanatory view of a position module learning operation using a neural network.

FIG. 17 is an explanatory view of a position module learning operation using a neural network. In FIG. 17, an object recognition system 20 collects data of an object 22 placed in a world view 21, by using sensors 23, and produces an outside image 25 by sampling projection 24 of the sensor data. For the position module, the position "d" of the partial feature in the object image is observed by varying the position-attitude of the object 22, the object position-attitude S is given to an input unit as teaching data and the partial feature position d for the outside image 25 is given to an output unit, then learning by propagation backward is done.

Figure 18:
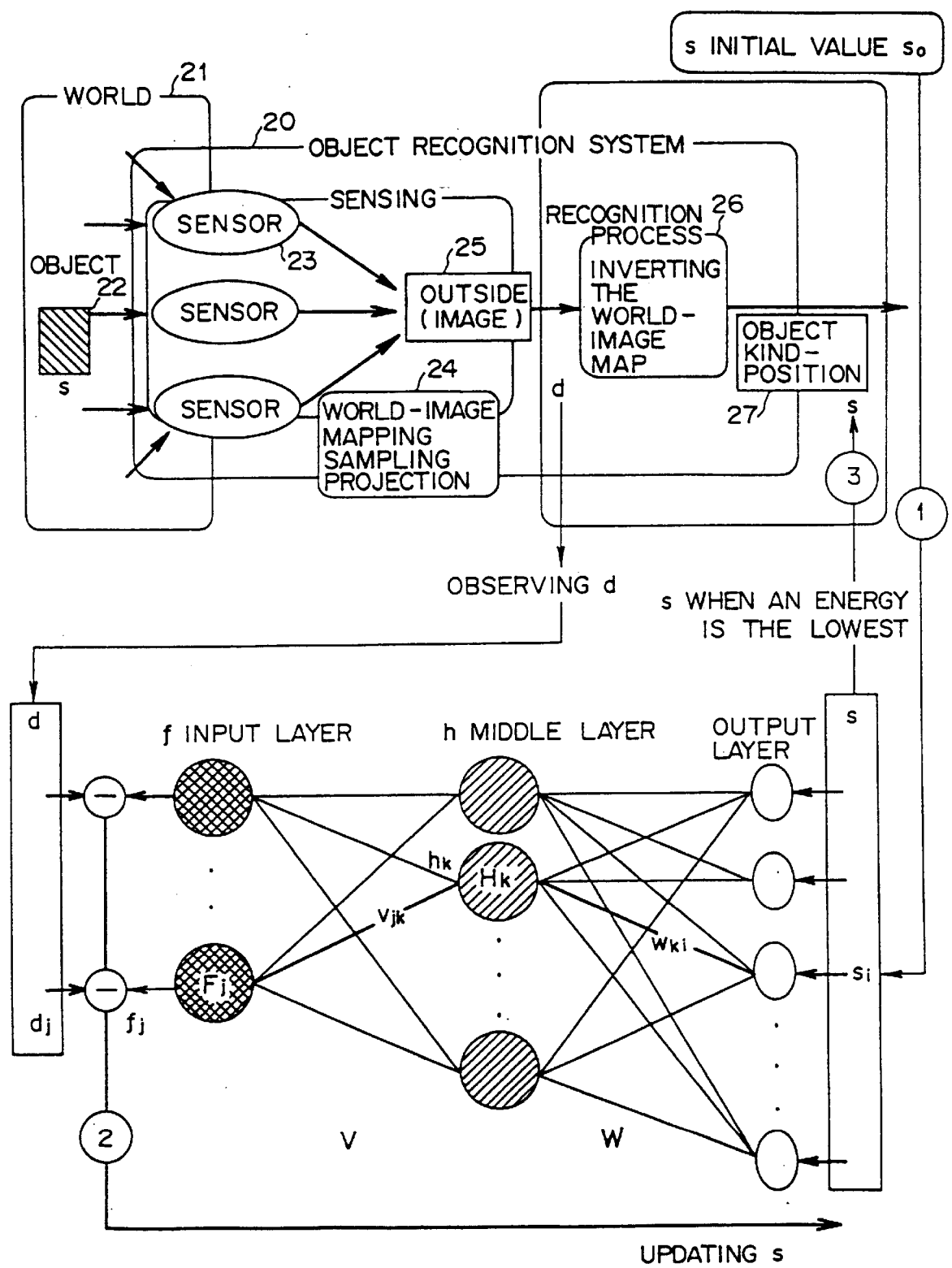
FIG. 18 is an explanatory view of a position module recognition operation using a neural network.

FIG. 18 is an explanatory view of a position module recognition operation using a neural network. Initial value $s_i$ for the object position-attitude S is assumed in process 1 (circled), then input to the input unit. In this embodiment, the relative position-attitude between the camera and the object which the prediction module 11 outputs as this initial value can be used. Then, the partial feature position "f" on the picture image output from the neural network is compared with the partial feature position "d" in the image 25 actually observed by sensors 23, in process 2 (circled), and the difference between them is determined. Then, the object position-attitude S, in which an energy function corresponding to this difference becomes a minimum in process 3 (circled), is output as the cognitive result from the object kind and position 27, and the kind of the object through a recognition process 26.

Thus, the prediction module 11 outputs only an initial value for the relative position-attitude between the camera and the object in recognizing the position-attitude using the neural network, the object position-attitude for minimizing the energy function is obtained without output from the prediction module 11, by the neural network as the position module. The following is a reference for an "Iterative Inversion" method.

D. Masumoto, T. Kimoto, and S. Nagata, "A Sensory Information Processing System Using Neural Networks-Three-Dimensional Object Recognition with Sensorimonitor Fusion," In Proceeding of 1993 IEEE International Conference on Neural Networks, Vol. II, 655/660 (1993).

In the "Iterative Inversion" method, the energy function $$E(s, d) = \sum_i \{f_i(s) - d_i\}^2 \quad (1)$$

for the difference between an actual image position "d" and a neural network output "f" obtained in process 2 (circled) in FIG. 18, is minimized by the method of steepest descent as described in the reference.

$$s_i(t + \Delta t) = s_i(t) - K \frac{\partial E(s, d)}{\partial s_i} \quad (2)$$

K is constant, and the value of S for minimizing the energy function becomes a solution to the energy function.
The second term of the right side can be developed to the following expression.

$$\frac{\partial E(s, d)}{\partial s_i} = \frac{\partial U(s, 2d)}{\partial s_i} + \frac{\partial U(s)}{\partial s_i} \quad (3)$$

The first term of this expression is further considered.

$$\frac{\partial U(s, d)}{\partial s_i} = 2 \sum_j \{f_j(s) - d_j\} \frac{\partial f_j(s)}{\partial s_i} \quad (4)$$

The right term partial differential represents how large the image variation is. Namely, this means to what degree the variation of one unit value in the input layer of the neural network influences the variation of the one unit output value from an output layer. This can be calculated as follows:

$$\begin{aligned} \frac{\partial f_j(s)}{\partial s_i} &= \frac{df_j}{dF_j} \frac{\partial F_j}{\partial s_i} \\ &= \sigma'(F_j) \sum_k v_{jk} \frac{\partial h_k}{\partial s_i} \\ &= \sigma'(F_j) \sum_k v_{jk} \sigma'(H_k) \frac{\partial H_k}{\partial s_i} \\ &= \sigma'(F_j) \sum_k v_{jk} \sigma'(H_k) w_{ki} \end{aligned} \quad (5)$$

Input layer unit i input value; $s_i$,
Connection weight between a middle layer unit k and the input layer unit 1; $w_{ki}$,
Middle layer unit k input value; $H_k \Sigma_i w_{ki} s_i$,
Middle unit k output value; $h_k = \sigma(H_k)$, ($\sigma$ is unit input-output function),
Connection weight between the output unit j and the middle unit k; $v_{jk}$,
Output unit j input value; $F_j = \Sigma_k v_{jk} h_k$,
Output unit j output value; $f_k = \sigma(F_k)$.

Therefore, $$\frac{\partial U(s,d)}{\partial s_i} = 2\sum_j \{f_j - d_j\}\sigma'(F_j)\sum_k v_{jk}\sigma'(H_k)w_{ki} \quad (6)$$

Especially, as "$\sigma$" the sigmoid function $$y = \frac{1}{1+e^{-x}} \quad (7)$$

is used, then, $$\begin{aligned} y' &= \sigma'(x) \\ &= \sigma(x)(1-\sigma(x)) \\ &= y(1-y) \end{aligned} \quad (8)$$

therefore, $$\frac{\partial U(s,d)}{\partial s_i} = 2\sum_j \{f_j - d_j\}f_j(1-f_j)\sum_k v_{jk}h_k(1-h_k)w_{ki} \quad (9)$$

is obtained clearly.

Figure 19:
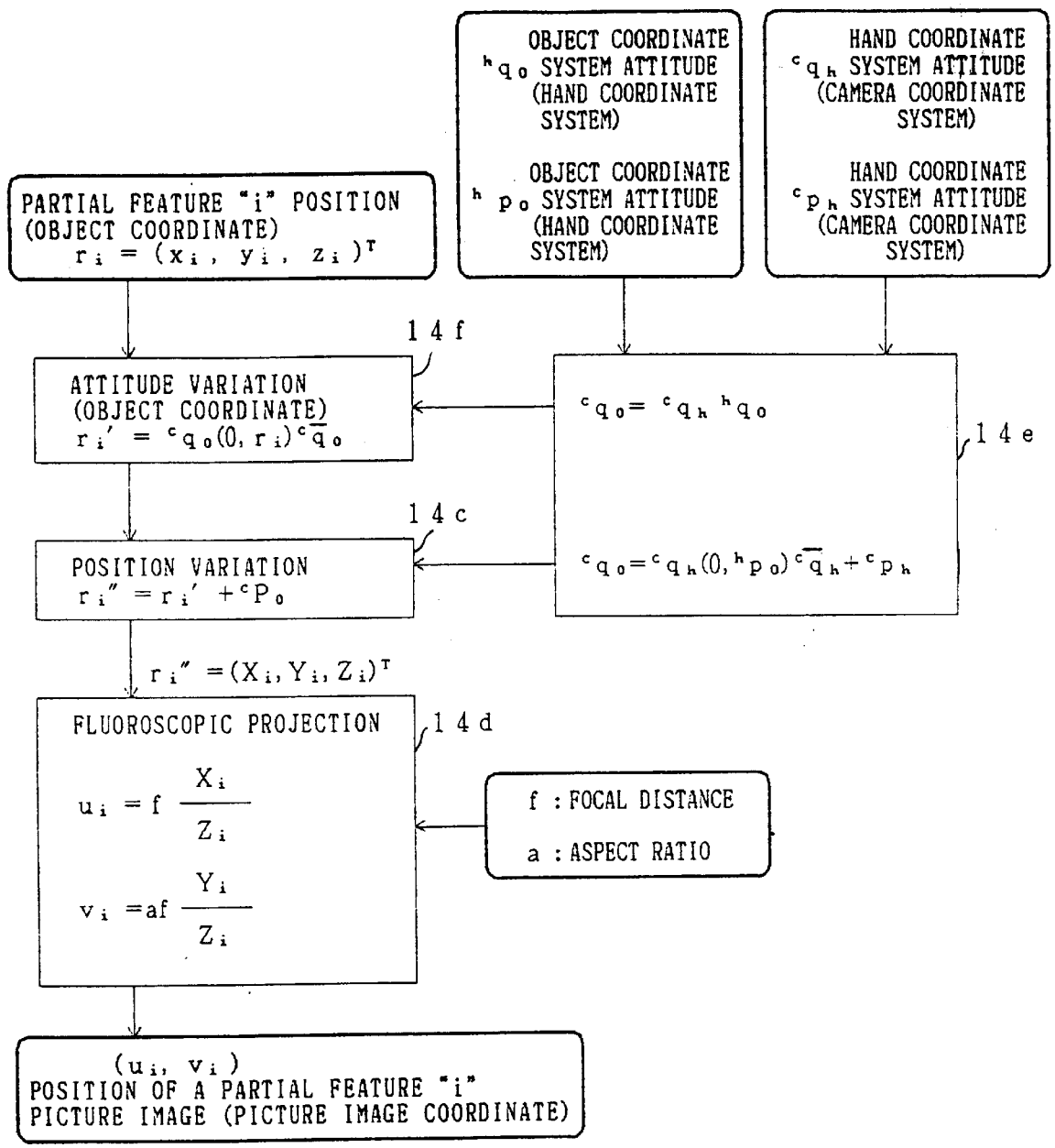
FIG. 19 is an explanatory view of a position module operation using a four-element number.

Next, as a preferred embodiment of a different position module, FIG. 19 is a view modifying FIG. 12 and FIG. 16 by using a rotation representation based on unit quaternions for enabling the distance measurement definition in a rotation space. The following reference is for the physical meaning and calculation rules of the unit quaternions.

B. K. P. Horn, "Closed-form Solution of Absolute orientation using unit quaternions," J. Opt, Soc. Am. A/Vol. 4, No. 4, April 1987

Here, $$q(0,r)$$

in FIG. 19 is calculated for later use. q represents the object attitude, and a rotational matrix is calculated from q elements. Moreover, r represents the object position, and can be treated as position vector of the base point of the object in a suitable coordinate system. Further, $$\bar{q}$$

designates the conjugate number of q. If, $$q = (q_0, q_x, q_y, q_z), \quad (10)$$

$$r = (r_x, r_y, r_z) \quad (11)$$

are possible, and $$\begin{aligned} &q(0,r)\bar{q} \\ &= (q_0, q_x, q_y, q_z)(0, r_x, r_y, r_z)(q_0, -q_x, -q_y, -q_z) \\ &= [-q_x r_x - q_y r_y - q_z r_z, \\ &\quad q_0 r_x + q_x r_0 + q_y r_z - q_z r_y, \\ &\quad q_0 r_y - q_x r_z + q_y r_0 - q_z r_x, \\ &\quad q_0 r_z + q_x r_y - q_y r_x - q_z r_0] \\ &\quad (q_0, -q_x, -q_y, -q_z) \\ &= [(q_0 r_z + q_y r_z - q_z r_y)q_x + \\ &\quad (q_0 r_y - q_x r_z + q_z r_x)q_y + \\ &\quad (q_0 r_z - q_x r_y - q_y r_x)q_z, \\ &\quad (-q_x r_x - q_y r_y - q_z r_z)(-q_x) + \\ &\quad (q_0 r_x + q_y r_z - q_z r_y)q_0 + \\ &\quad (q_0 r_y - q_x r_z + q_z r_x)(-q_z) + \\ &\quad (q_0 r_z + q_x r_y + q_y r_x)(-q_y), \\ &\quad (-q_x r_x - q_y r_y - q_z r_z)(-q_y) - \\ &\quad (q_0 r_x + q_y r_z - q_z r_y)(-q_z) + \\ &\quad (q_0 r_y - q_x r_z + q_z r_x)q_0 + \\ &\quad (q_0 r_z + q_x r_y - q_y r_x)(-q_x), \\ &\quad (-q_x r_x - q_y r_y - q_z r_z)(-q_z) + \\ &\quad (q_0 r_x + q_y r_z - q_z r_y)(-q_y) + \\ &\quad (q_0 r_y - q_x r_z + q_z r_x)(-q_x) + \\ &\quad (q_0 r_z + q_x r_y - q_y r_x)q_0] \end{aligned} \quad (12)$$

is developed.

Finally, position module learning and recognition are explained in more detail, including the case shown in FIG. 19. As mentioned before, for position module learning, parameters to be identified by the position module are
- camera internal parameters (focal distance, aspect ratio),
- object feature position in the object coordinate system (object model), and
- relative position-attitude between the camera coordinate system and the hand coordinate system (hand-eye calibration), and for recognizing,
- relative position-attitude between the current hand coordinate system and the object coordinate system determined in learning.

To identify these parameters, the following prediction function is defined.

Prediction function E is defined by multiplying itself by the distance between a predicted position and an actual position for each partial feature on the picture image, and accumulating this value for all partial features.

$$E = \sum_{i=0}^{N} [(u_i^{predicted} - u_i^{observed})^2 + (v_i^{predicted} - v_i^{observed})^2] \quad (13)$$

$$= \sum_{i=0}^{N} (\Delta u_i^2 + \Delta v_i^2) \quad (14)$$

$$\Delta u_i = u_i^{predicted} - u_i^{observed} \quad (15)$$

$$\Delta v_i = v_i^{predicted} - v_i^{observed} \quad (16)$$

Here, $(u_i^{observed}, v_i^{observed})$ is a position in which the partial feature i is actually measured, and $(u_i^{predicted}, v_i^{predicted})$ is a predicted position for the partial feature calculated by assuming the value of the parameters to be determined by some method. Here, it means a position module output corresponding to the initial prediction value of the prediction module 11.

The method of least square is a method to identify parameter values by minimizing the prediction function thus defined, by a squares error. The following are references for the parameter prediction by the method of least squares:

F. Arman and J. K. Aggarwal, "Model-Based Object Recognition in Dense-Range Images-A Review," ACM Computing Surveys, Vol. 25, No. 1, pp. 5–43 (1986);

Hiroshi Konno, Hiroshi Yamashita, "Hisenkei-Keikaku-Hou," Nikka-Giren (1978);

Toru Nakagawa, Yoshio Koyanagi, "Saishou-Jijouhou niyoru Jikken-Data-Kaiseki," Tokyo-Daigaku-Shuppan-Kai (1982).

The method of steepest descent is used in this invention in order to minimize the prediction function defined above. The method of steepest descent is an algorithm to search for the minimum value of the prediction function by using a gradient (once differentiated) for variables for the prediction function to identify. When the minimum value exists, the minimum value may not be obtained by searching once only. If so, searching is executed many times by varying the initial value, and the lowest value among the minimum values found is usually used as the minimum value.

Searching once using the method of steepest descent is executed according to the following steps.

1. Initial value prediction (t=0): value for variable $X=(X_0, X_1, \ldots, X_n)$ is predicted by some suitable method. Here, this value is set to X(0).

2. Finish state $$|E(x(t)) - E(x(t-1))| < \epsilon \tag{17}$$

where $\epsilon$ ia is a predetermined small positive number.

If this state is reached, termination is made. E(X(t)) is the minimum value (minimum value candidate), and X(t) is the identification value for the variable. If this state is not reached, step 3 is executed.

3. Updating $$x_i(t+1) = x_i(t) - \lambda \left( \frac{\partial E(x)}{\partial x_i} \right)_{x=x(t)} \tag{18}$$

where, $\lambda$ is a suitable positive number to determine a searching range.

Then, step 2 is executed as t=t+1, and determination for the finish state is executed.

When the method of steepest descent is used, the differentiation (slope) as E, $\delta E(X)/\delta X$, should be calculated. where, $$\frac{\partial E(x)}{\partial x} = 2 \sum_{i=0}^{N} \left[ \Delta u_i \frac{\partial u_i^{predicted}}{\partial x} + \Delta v_i \frac{\partial v_i^{predicted}}{\partial x} \right] \tag{19}$$

Below, for each parameter, $$\frac{\partial u_i^{predicted}}{\partial X}$$

are calculated (hereinafter, $\delta u_1/\delta x$, $\delta v_1/\delta x$ are used respectively).

For calculating camera internal parameters (focal distance, aspect ratio), the focal distance f is $$\frac{\partial u_i}{\partial f} = \frac{X_i}{Z_i} \tag{20}$$

-continued $$\frac{\partial v_i}{\partial f} = \frac{Y_i}{Z_i} \tag{21}$$

and, the aspect ratio is $$\frac{\partial u_i}{\partial a} = 0 \tag{22}$$

$$\frac{\partial v_i}{\partial a} = f \frac{Y_i}{Z_i} \tag{23}$$

For calculating the object feature position $(x_j, y_j, z_j)$ in the object coordinate system, $$\frac{\partial u_i}{\partial x_j} = \frac{f}{Z_i} \left( \frac{\partial X_i}{\partial x_j} - \frac{X_i}{Z_i} \frac{\partial Z_i}{\partial x_j} \right) \tag{24}$$

$$\frac{\partial v_i}{\partial x_j} = \frac{af}{Z_i} \left( \frac{\partial Y_i}{\partial x_j} - \frac{Y_i}{Z_i} \frac{\partial Z_i}{\partial x_j} \right) \tag{25}$$

is obtained, and if $i \neq j$, $$\frac{\partial u_i}{\partial x_j} = 0 \tag{26}$$

$$\frac{\partial v_i}{\partial x_j} = 0 \tag{27}$$

is obtained. Thus, it is sufficient to assume the case of i=j. Hereinafter, subscript letters such as i, j are eliminated.

Moreover, expressions (26) and (27) are based on the assumption that other features should not change if only feature "j" is changed a little in the object coordinate system of the present invention. The correct solution can be obtained, and can be calculated simply by observing a plurality of features from many observation points if this assumption is set.

Here, when expression (12) is used with $^cq_0 = (q_0, q_x, q_y, q_z)$, $$\frac{\partial X}{\partial x} = q_x^2 + q_0^2 - q_z^2 - q_y^2 \tag{28}$$

$$\frac{\partial Y}{\partial x} = 2(q_z q_y + q_0 q_z) \tag{29}$$

$$\frac{\partial Z}{\partial x} = 2(q_z q_x + q_0 q_y) \tag{30}$$

then the slope can be calculated by substituting this expression into the original expression.

Further, similar calculations can be made for $\delta u_i/\delta y_i$, $\delta v_i/\delta y_i$, $\delta u_i/\delta z_i$, and $\delta v_i/\delta z_i$.

The relative position-attitude $^cq_h$ is calculated as follows.

$$\frac{\partial u_i}{\partial^c q_h} = \frac{f}{Z_i} \left( \frac{\partial X_i}{\partial^c q_h} - \frac{X_i}{Z_i} \frac{\partial Z_i}{\partial^c q_h} \right) \tag{31}$$

$$\frac{\partial v_i}{\partial^c q_h} = \frac{af}{Z_i} \left( \frac{\partial Y_i}{\partial^c q_h} - \frac{Y_i}{Z_i} \frac{\partial Z_i}{\partial^c q_h} \right) \tag{32}$$

This expression is also calculated using expressions such as (12), etc. The relative position-attitude $^hq_0$, between the current hand coordinate system and the object coordinate system determined in learning, is expressed as follows.

$$\frac{\partial u_i}{\partial^h q_0} = \frac{f}{Z_i} \left( \frac{\partial X_i}{\partial^h q_0} - \frac{X_i}{Z_i} \frac{\partial Z_i}{\partial^h q_0} \right) \tag{33}$$

$$\frac{\partial v_i}{\partial^h q_0} = \frac{af}{Z_i} \left( \frac{\partial Y_i}{\partial^h q_0} - \frac{Y_i}{Z_i} \frac{\partial Z_i}{\partial^h q_0} \right) \tag{34}$$

This is also calculated using expressions such as (12), etc.

What is claimed is:

1. A system for recognizing an object from cognitive observation data existing in external circumstances, comprising:

state prediction value output means for outputting a state prediction value of said object from observation data for a cognitive object;

partial feature observation result prediction means for outputting a predicted value of said observation data for a partial feature of said cognitive object for input of said state prediction value, said partial feature observation result prediction means comprising more than one hierachical neural network each corresponding to more than one partial feature of said cognitive object;

partial feature prediction position output means for outputting an observation position of more than one partial feature in observation results of said cognitive object for said input of said state prediction value; and means for recognizing said object by decreasing a difference between a predicted position which said partial feature prediction position output means outputs and a position on observation results for each partial feature determined based on said output from said partial feature observation result prediction means.

2. The system defined in claim 1, further comprising:

visible-invisible determination means for determining whether each one of more than one partial feature in said cognitive object is visible or invisible for said observation data of said cognitive object.

3. The system defined in claim 2, wherein said state prediction value output means use a geometric hashing method when predicting cognitive object states.

4. The system defined in claim 2, wherein said state prediction value output means use a combined method of a hough conversion method and a geometric hashing method when predicting cognitive object states.

5. The system defined in claim 2, wherein said partial feature observation result prediction means comprise more than one neural network, each of which corresponds to each of more than one partial feature of said cognitive object.

6. The system defined in claim 5, wherein a hierarchical neural network learning process comprises a preparation learning phase in which users teach which part corresponds to partial feature observation data in sensor data as cognitive object observation data, and an automatic learning phase in which a system automatically learns said sensor data corresponding to said partial features.

7. The system defined in claim 2, wherein said partial feature prediction position output means comprise a mathematical model describing relationships between more than one partial feature prediction position and said state prediction value.

8. The system defined in claim 2, wherein said partial feature prediction position output means comprise hierarchical neural networks.

9. The system defined in claim 2, wherein a square error between an actual partial feature position and output from said partial feature prediction position output means is used as an estimation function, an output from said state prediction value output means is modified, and said object is recognized.

10. The system defined in claim 1, further comprising:

outside circumstance observation sensor means for giving cognitive object observation data existing in said outside circumstances to said state prediction value output means.

11. The system defined in claim 10, wherein said outside circumstance observation sensor means comprise a visible sensor.

12. The system defined in claim 10, wherein said outside circumstance observation sensor means comprise a plurality of kinds of sensors.

13. The system defined in claim 10, further comprising:

means for retrieving partial data containing more than one partial features of said cognitive object from output data from said outside circumstance observation sensor and giving to said state prediction value output means.

14. The system defined in claim 10, further comprising:

means for prior processing output data from said outside circumstance observation sensor, and giving all data or partial data which are prior processed to said state prediction value output means.

15. The system defined in claim 10, further comprising:

means for extracting more than one edge of said cognitive object from external circumstance observation sensor output data, and giving data for extracted edges to said state prediction value output means.

16. The system defined in claim 1, wherein said state prediction value output means use a generalized Hough conversion when predicting states for said cognitive object.

17. The system defined in claim 1, wherein said state prediction value output means use a geometric hashing method when predicting cognitive object states.

18. The system defined in claim 1, wherein said state prediction value output means use a combined method of a geometric hashing method and a Hough conversion method when predicting cognitive object states.

19. The system defined in claim 1, wherein a learning process for said hierarchical networks comprises a preparation learning phase in which users teach which part a partial feature corresponds to in sensor data as observation data of said cognitive object, and an automatic learning phase in which a system automatically learns sensor data corresponding to said partial feature.

20. The system defined in claim 1, wherein said partial feature prediction position output means comprise a mathematical model describing relationships between a prediction position of more than one partial feature image and said state prediction value.

21. The system defined in claim 1, wherein said partial feature prediction position output means comprise a hierarchical neural network.

22. The system defined in claim 1, wherein a square error between an actual partial feature position and output from said partial feature prediction position output means is used as prediction function, an output from said state prediction value output means is modified in order to minimize said prediction function, and said object is recognized.

23. The system defined in claim 1, wherein said state prediction value output means use a generalized Hough conversion method for predicting cognitive object states.

* * * * *